(12) United States Patent  
Saliger et al.

(10) Patent No.: US 8,869,948 B2  
(45) Date of Patent: Oct. 28, 2014

(54) WHEEL CHOCKS AND ASSOCIATED METHODS AND SYSTEMS

(75) Inventors: David Saliger, Hurst, TX (US); L. Blake Whitley, Arlington, TX (US)

(73) Assignee: 4Front Engineered Solutions, Inc., Carrollton, TX (US)

( * ) Notice: Subject to any disclaimer, the term of this patent is extended or adjusted under 35 U.S.C. 154(b) by 539 days.

(21) Appl. No.: 12/957,400

(22) Filed: Dec. 1, 2010

(65) Prior Publication Data

US 2011/0162916 A1    Jul. 7, 2011

Related U.S. Application Data

(60) Provisional application No. 61/265,681, filed on Dec. 1, 2009.

(51) Int. Cl.
*B60T 3/00* (2006.01)
*B65G 69/00* (2006.01)

(52) U.S. Cl.
CPC ............. *B60T 3/00* (2013.01); *B65G 69/005* (2013.01)
USPC ............ 188/4 R; 188/32; 188/36; 414/396; 414/401; 414/584

(58) Field of Classification Search
USPC .......... 188/4 R, 5, 32, 36; 414/396, 401, 426, 414/429, 584, 809
See application file for complete search history.

(56) References Cited

U.S. PATENT DOCUMENTS

| | | | |
|---|---|---|---|
| 2,801,011 A | 7/1957 | Overlach et al. | |
| 3,305,049 A | 2/1967 | Willey | |
| 4,207,019 A | 6/1980 | Cone | |
| 4,400,127 A | 8/1983 | Metz | |
| 4,555,211 A | 11/1985 | Metz | |
| 4,679,974 A | 7/1987 | Blunden | |
| 4,969,792 A | 11/1990 | Ellis et al. | |
| 4,988,254 A | 1/1991 | Alexander | |
| 5,026,242 A | 6/1991 | Alexander | |
| 5,071,306 A | 12/1991 | Alexander | |
| 5,096,359 A | 3/1992 | Alexander | |
| 5,120,181 A | 6/1992 | Alexander | |

(Continued)

FOREIGN PATENT DOCUMENTS

| | | |
|---|---|---|
| CA | 2234974 A1 | 10/1999 |
| CA | 2297384 C | 2/2001 |

(Continued)

OTHER PUBLICATIONS

International Search Report and Written Opinion for PCT/US2009/033100 Applicant: Rite-Hite Holding Corporation; Date of Mailing: Apr. 15, 2009, 15 pages.

(Continued)

*Primary Examiner* — Thomas J Williams  
*Assistant Examiner* — Mariano Sy  
(74) *Attorney, Agent, or Firm* — Perkins Coie LLP

(57) ABSTRACT

Wheel chocks for use with loading docks are disclosed herein. In one embodiment, a manual wheel chock configured in accordance with the present disclosure includes a restraint arm pivotally coupled to a carriage that is rollably mounted to a longitudinal guide rail. The restraint arm is rotatable in a first direction to move a wheel stop in front of a wheel of a vehicle parked adjacent the guide rail. The restraint arm is also rotatable in a second direction opposite to the first direction to move the wheel stop away from the vehicle wheel.

26 Claims, 21 Drawing Sheets

(56) References Cited

U.S. PATENT DOCUMENTS

| | | |
|---|---|---|
| 5,249,905 A | 10/1993 | Warner et al. |
| 5,259,718 A | 11/1993 | Alexander |
| 5,336,033 A | 8/1994 | Alexander |
| 5,346,353 A | 9/1994 | Alexander |
| 5,375,965 A | 12/1994 | Springer et al. |
| 5,454,682 A | 10/1995 | Alexander |
| 5,505,575 A | 4/1996 | Alexander |
| 5,531,557 A | 7/1996 | Springer |
| 5,553,987 A | 9/1996 | Ellis |
| 5,582,498 A | 12/1996 | Springer et al. |
| 5,664,930 A | 9/1997 | Ellis |
| 5,709,518 A | 1/1998 | Alexander et al. |
| 5,743,697 A | 4/1998 | Alexander |
| 5,762,459 A | 6/1998 | Springer et al. |
| 5,896,957 A | 4/1999 | Berends et al. |
| 5,927,928 A | 7/1999 | Hageman et al. |
| 5,934,857 A | 8/1999 | Alexander |
| 6,082,952 A | 7/2000 | Alexander |
| 6,092,970 A | 7/2000 | Hahn et al. |
| 6,123,496 A | 9/2000 | Alexander |
| 6,238,163 B1 | 5/2001 | Springer et al. |
| 6,250,432 B1 | 6/2001 | Hageman et al. |
| 6,276,496 B1 | 8/2001 | Hageman et al. |
| RE37,570 E | 3/2002 | Springer et al. |
| 6,357,987 B1 | 3/2002 | Palus |
| 6,368,043 B1 | 4/2002 | Leum et al. |
| 6,371,253 B1 | 4/2002 | Berends et al. |
| 6,478,525 B2 | 11/2002 | Hageman et al. |
| 6,505,713 B1 | 1/2003 | Paul et al. |
| 6,524,053 B2 | 2/2003 | Hahn et al. |
| 6,589,003 B2 | 7/2003 | Berends |
| 6,676,360 B2 | 1/2004 | Springer et al. |
| 6,690,287 B2 | 2/2004 | Jette et al. |
| 7,032,720 B2 | 4/2006 | Jette et al. |
| 7,226,265 B2 | 6/2007 | Wilson |
| 7,264,092 B2 | 9/2007 | Jette |
| 8,499,897 B2 | 8/2013 | Brooks et al. |
| 2002/0136620 A1 | 9/2002 | Berends |
| 2002/0141852 A1 | 10/2002 | Hahn et al. |
| 2003/0159892 A1 | 8/2003 | Jette |
| 2005/0133315 A1 | 6/2005 | Hoofard |
| 2005/0226705 A1 | 10/2005 | Wilson |
| 2006/0051196 A1 | 3/2006 | McDonald |
| 2006/0144649 A1 | 7/2006 | Jette |
| 2008/0124203 A1 | 5/2008 | McDonald |
| 2009/0026022 A1 | 1/2009 | Andersen et al. |
| 2009/0194375 A1 | 8/2009 | Andersen et al. |
| 2009/0194376 A1 | 8/2009 | Brooks et al. |
| 2009/0223764 A1 | 9/2009 | Andersen et al. |
| 2010/0260586 A1 | 10/2010 | Manone et al. |
| 2011/0176896 A1 | 7/2011 | Andersen et al. |
| 2012/0006632 A1 | 1/2012 | Nelson |
| 2013/0292214 A1 | 11/2013 | Brooks et al. |

FOREIGN PATENT DOCUMENTS

| | | |
|---|---|---|
| DE | 4120035 A1 | 12/1992 |
| DE | 4427406 C1 | 10/1995 |
| EP | 0452519 A1 | 10/1991 |
| EP | 0609049 A1 | 8/1994 |
| EP | 0684915 A1 | 12/1995 |
| EP | 0775653 A1 | 5/1997 |
| EP | 1112950 A1 | 7/2001 |
| EP | 1764275 | 3/2007 |
| EP | 2170663 A1 | 4/2010 |
| FR | 2736336 A1 | 1/1997 |
| WO | WO-95/18029 A1 | 7/1995 |
| WO | WO-9935067 | 7/1999 |
| WO | WO-2004/078618 A1 | 9/2004 |
| WO | WO-2004078618 A1 | 9/2004 |
| WO | WO-2009032372 A1 | 3/2009 |
| WO | WO-2009/100146 A1 | 8/2009 |
| WO | WO-20090100146 A1 | 8/2009 |
| WO | WO-2009/111244 A1 | 9/2009 |
| WO | WO-20090139946 A1 | 11/2009 |
| WO | WO-2010/090884 A1 | 8/2010 |
| WO | WO-2010118032 A1 | 10/2010 |

OTHER PUBLICATIONS

Automatic Wheel Restraint Surface Mounted User's Manual, Apr. 2006, SPX Dock Products, Inc., 44 pages.

Vehicle Restraints, Safety Chock Series SLSC 2000, User's Manual, Sep. 1999, SERCO, 32 pages.

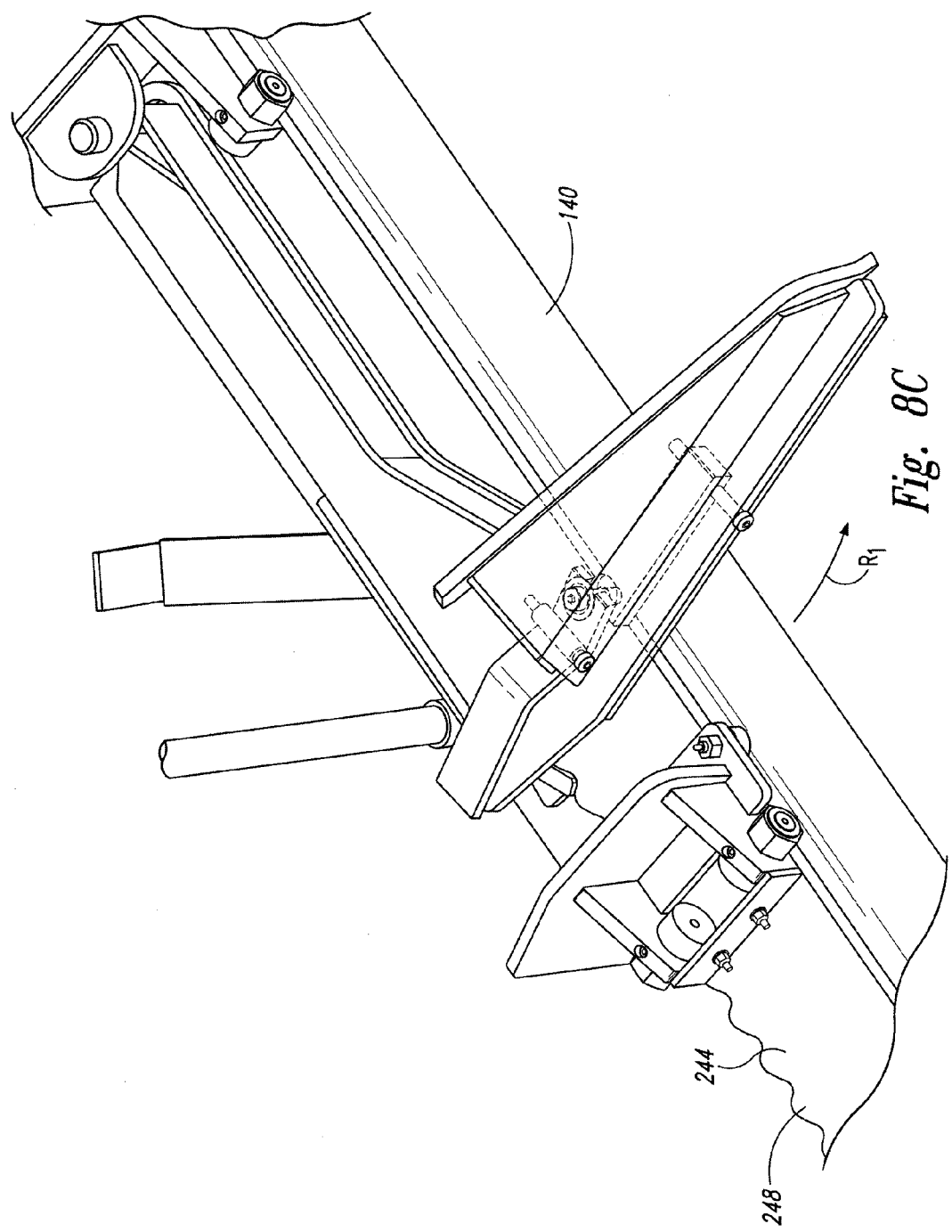

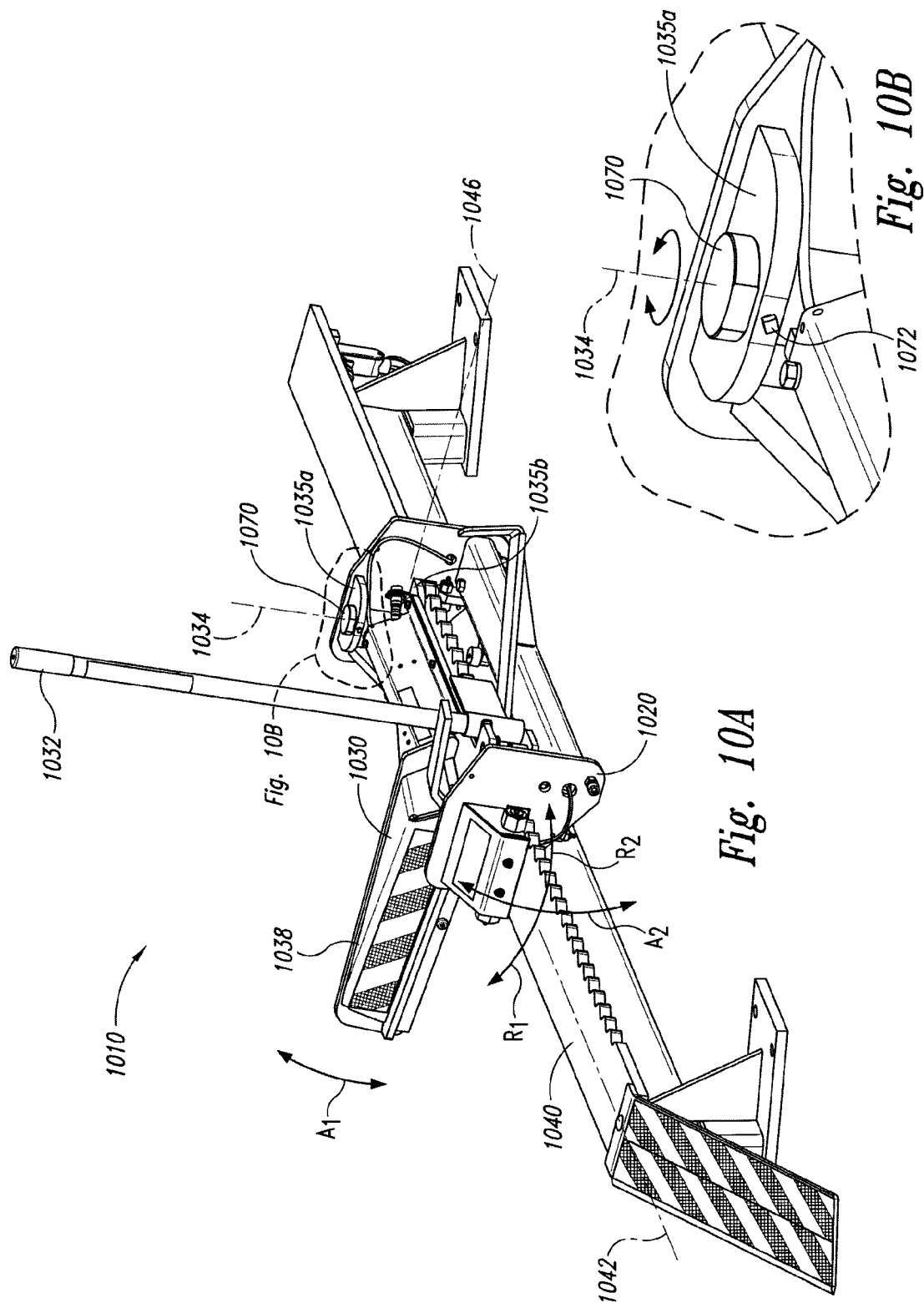

WHEEL CHOCKS AND ASSOCIATED METHODS AND SYSTEMS

CROSS-REFERENCE TO RELATED APPLICATION INCORPORATED BY REFERENCE

The present application claims priority to U.S. Provisional Patent Application No. 61/265,681, filed Dec. 1, 2009, and entitled "WHEEL CHOCKS AND ASSOCIATED METHODS AND SYSTEMS," which is incorporated herein in its entirety by reference.

TECHNICAL FIELD

The following disclosure relates generally to wheel chocks and, more particularly, to wheel chocks for use with loading docks.

BACKGROUND

Various types of devices and systems are known for preventing a vehicle from moving away from a loading dock during loading and unloading operations. These devices and systems include, for example, mechanical restraints which can be mounted to the dock face or on the parking surface in front of the dock. Many of the mechanical restraints currently in use engage the ICC bar or rear impact guard mounted on the rear of the trailer or transport vehicle to prevent it from moving away from the loading dock. This type of restraint may not be usable, however, if the ICC bar is bent or otherwise displaced, or if a hydraulic tailgate or other equipment is attached to the rear of the vehicle.

Other types of mechanical vehicle restraints include devices that are buried in a pit in front of the loading dock. The devices typically include a chock that rises up to block a trailer wheel after the trailer is backed into position. These below-ground type chock systems can be expensive to install and maintain.

Automatic wheel chocking systems are also known. Such systems are typically positioned on the approach to the loading dock adjacent to the trailer parking area. These types of devices include wheel chocks that can be automatically actuated by the trailer wheels as the trailer moves into position at the dock.

BRIEF DESCRIPTION OF THE DRAWINGS

FIGS. 8A-8F are a series of partially transparent isometric views of the wheel chock of FIG. 1, further illustrating various stages of operation of the restraint arm during engagement with the guide rail.

FIG. 10A is an isometric view of a wheel chock having a restraint arm pivot with a cam adjustment feature configured in accordance with an embodiment of the disclosure, and FIG. 10B is an enlarged isometric view illustrating the cam adjustment feature in more detail.

DETAILED DESCRIPTION

Figure 1:
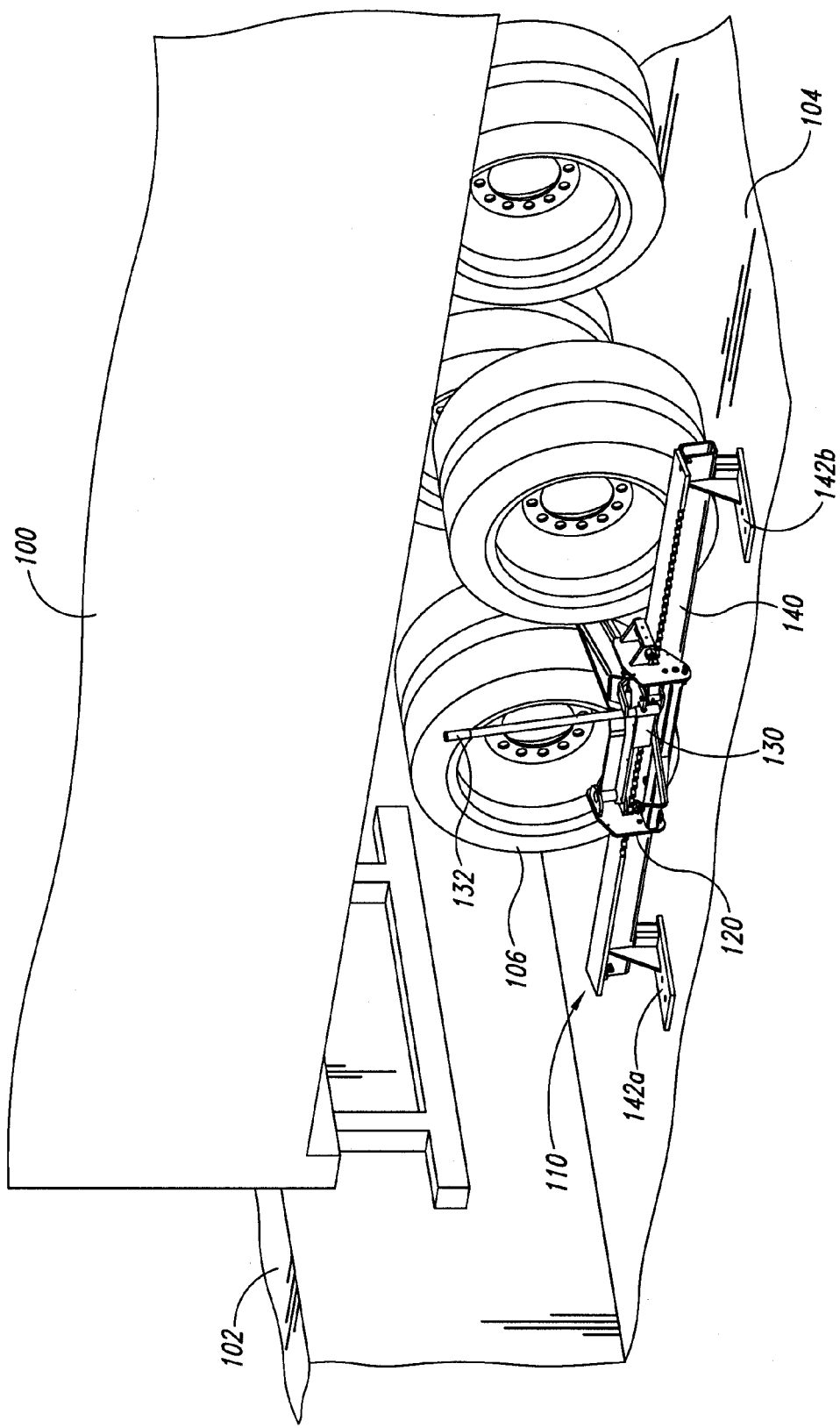
FIG. 1 is an isometric view of a wheel chock configured in accordance with an embodiment of the disclosure.

The present disclosure describes various embodiments of wheel chocking systems, such as manual wheel chock systems for use in securing trailers at loading docks during loading and unloading operations. In one embodiment, for example, a manual wheel chock includes a restraint arm pivotally coupled to a carriage. The carriage is movably supported on a guide rail by a plurality of rollers. The guide rail extends adjacent to a trailer pad in front of a loading dock. With the restraint arm retracted away from the rail, an operator can move the carriage along the longitudinal axis of the rail to position the carriage adjacent to a trailer tire. The operator can then rotate the restraint arm into position in front of the tire. As the restraint arm moves into this position, a locking mechanism automatically engages the guide rail and prevents the restraint arm from rotating away from the guide rail until the lock is released. The locking mechanism does not prevent movement of the carriage along the longitudinal axis of the guide rail. However, the restraint arm of this embodiment can further include a ratchet having a spring-loaded pawl that engages a series of teeth on the guide rail. When the restraint arm is locked into position in front of a tire, the pawl engages the teeth and restricts forward travel of the carriage while allowing rearward movement toward the tire. This locks the restraint arm in front of the tire, thereby preventing the trailer from moving away from the dock more than an acceptable amount, such as more than about 4 inches or less.

The operator can disengage or unlock the restraint arm by stepping on a foot pedal that releases the locking mechanism, and manually rotating the arm back and away from the tire. Retracting the restraint arm also disengages the ratchet pawl, allowing the operator to roll the carriage along the longitudinal axis of the guide rail into, for example, a stored or home position toward the dock face. The trailer can then pull away from the loading dock.

Certain details are set forth in the following description and in FIGS. 1-12 to provide a thorough understanding of various embodiments of the disclosure. Other details describing well-known structures and systems often associated with wheel chocks, loading docks and loading dock operations, trailer trucks, etc., have not been set forth in the following disclosure to avoid unnecessarily obscuring the description of the various embodiments of the disclosure.

Many of the details, dimensions, angles and other features shown in the Figures are merely illustrative of particular embodiments of the disclosure. Accordingly, other embodiments can add other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view of a trailer 100 secured in position at a loading dock 102 by a wheel chock 110 configured in accordance with an embodiment of the disclosure. In the illustrated embodiment, the wheel chock 110 includes a restraint arm 130 pivotally coupled to a carriage 120. The carriage 120 is movably coupled to a longitudinal guide rail 140. The guide rail 140 is supported by risers or mounting feet 142 (identified individually as a first mounting foot 142a and a second mounting foot 142b) which are fixedly attached to an approach or parking surface 104 in front of the loading dock 102. The guide rail 140 extends at least generally perpendicular to the dock 102 and parallel to the length of the trailer 100 adjacent one or more rear wheels 106. An operating handle 132 extends upwardly from the restraint arm 130. The operating handle 132 enables an operator to retract the restraint arm 130 from in front of the wheels 106 and move the carriage 120 fore and aft along the longitudinal axis of the guide rail 140.

Figure 2A:
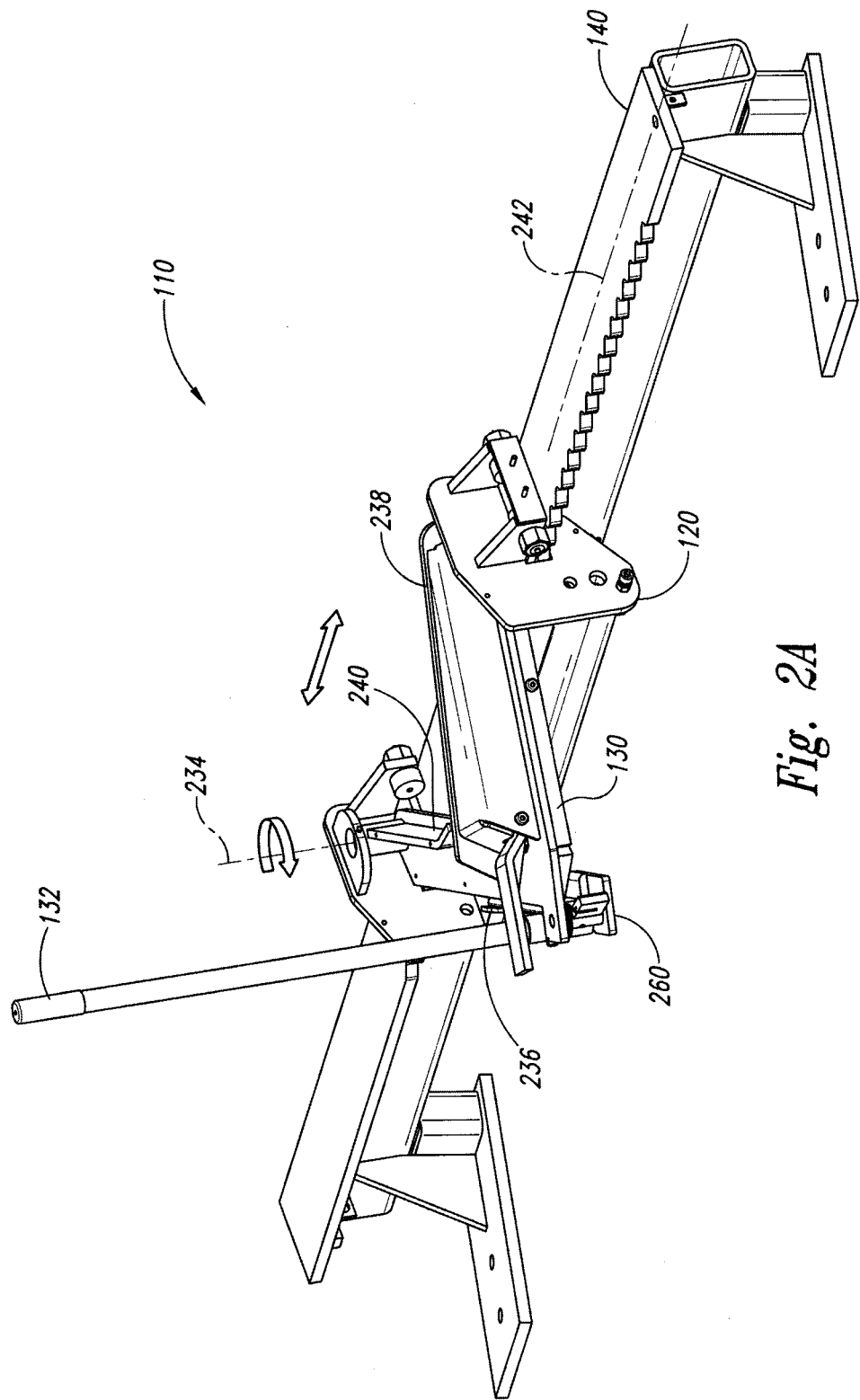
FIG. 2A is an enlarged isometric view of the wheel chock of FIG. 1 in a retracted position.
Figure 2B:
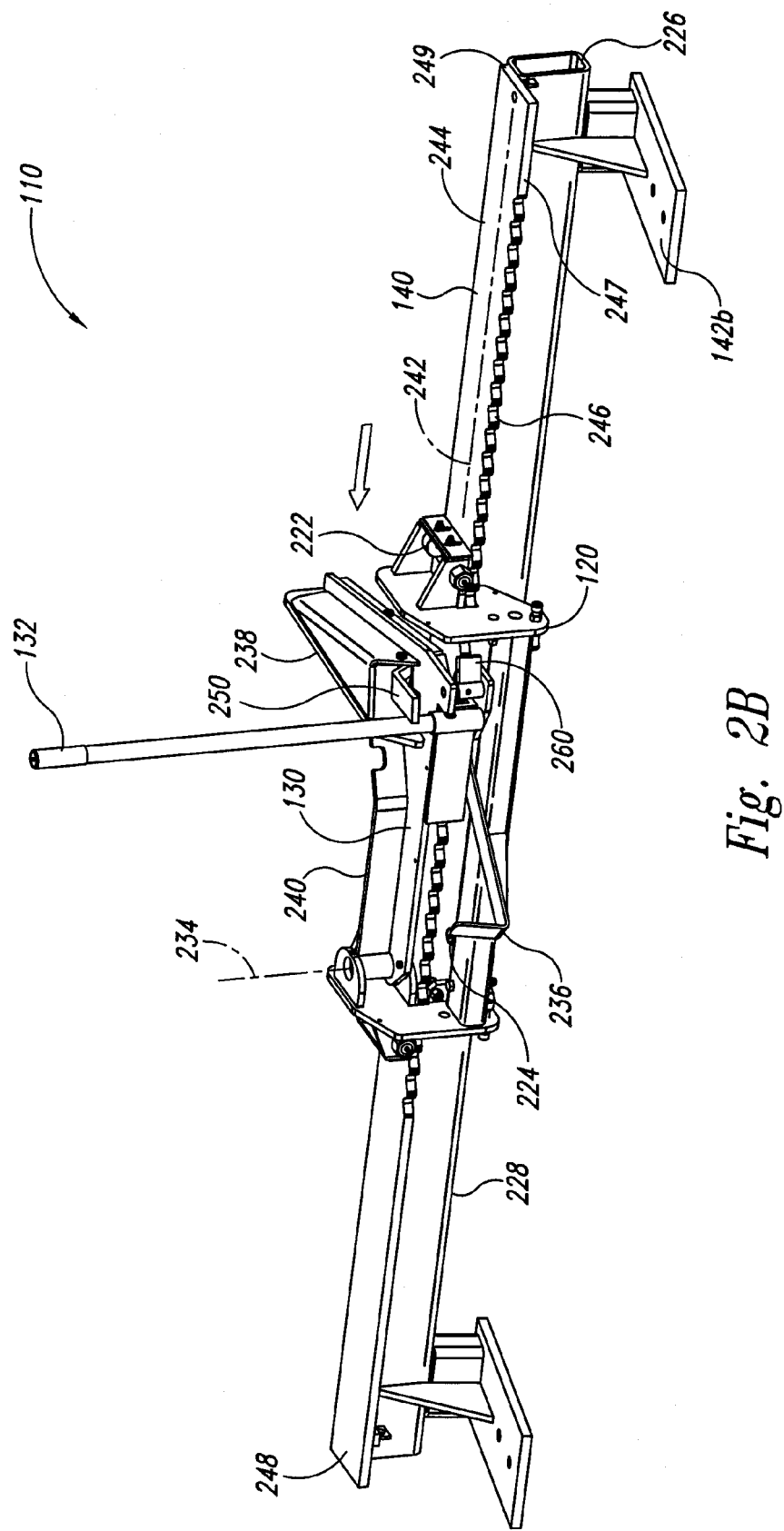
FIG. 2B is an enlarged isometric view of the wheel chock in an engaged position.

FIG. 2A is an isometric view of the wheel chock 110 with the restraint arm 130 retracted from the rail 140, and FIG. 2B is an isometric view of the wheel chock 110 with the restraint arm 130 engaged with the rail 140. Referring first to FIG. 2A, the restraint arm 130 includes a wheel stop 238 extending outwardly from a base 240 in an "L" configuration. A proximal end portion of the base 240 is pivotally coupled to the carriage 120 about a pivot axis 234. In the illustrated embodiment, the pivot axis 234 extends perpendicular to, or at least approximately perpendicular to, a longitudinal axis 242 of the rail 140.

Referring next to FIG. 2B, the guide rail 140 of the illustrated embodiment includes a longitudinal support beam 226 extending between the mounting feet 142. A planar top plate 248 is welded or otherwise fixedly attached to an upper surface of the support beam 226. The top plate 248 includes an upper surface 244 extending between an inboard edge portion 249 and an outboard edge portion 247. The outboard edge portion 247 includes a rack or series of teeth 246 configured to cooperate with a one-way locking mechanism or ratchet 260 mounted on the distal end portion of the restraint arm base portion 240. As described in greater detail below, the carriage 120 can include a plurality of top rollers 222 and outboard side rollers 224. The top rollers 222 roll against the upper surface 244 of the top plate 248, and the outboard side rollers 224 roll against an outboard side surface 228 of the support beam 226.

When the restraint arm 130 is retracted against an arm stop 236 as shown in FIG. 2A, the carriage 120 is free to roll back and forth along the longitudinal axis 242 of the rail 140. This allows an operator to grasp the handle 132 and move the carriage 120 to a longitudinal position adjacent a trailer wheel (not shown). The operator can then rotate the restraint arm 130 about the pivot axis 234 to position the wheel stop 238 in front of the trailer wheel as shown in FIG. 2B. Moving the wheel stop 238 into this position causes the restraint arm 130 to automatically engage the rail 140. Although the operator can still move the carriage 120 back toward the trailer wheel when the rail 140 is engaged, the ratchet 260 engages the teeth 246 and prevents the carriage 120 from moving away from the trailer wheel an appreciable amount along the longitudinal axis 242. To disengage the restraint arm 130 from the rail 140, the operator presses downwardly on a release pedal 250. Because the top surface 244 of the guide rail 140 of this embodiment is inclined slightly away from the trailer, gravity will tend to move the restraint arm 130 away from the trailer wheels 106. The operator can grasp the handle 132 and pull back or otherwise assist rotation of the restraint arm 130 outwardly about the pivot axis 234 until it comes to rest against the arm stop 236. The operator can then move the carriage 120 into a stored position along the longitudinal axis 242 and the trailer can depart the loading dock.

Figure 3:
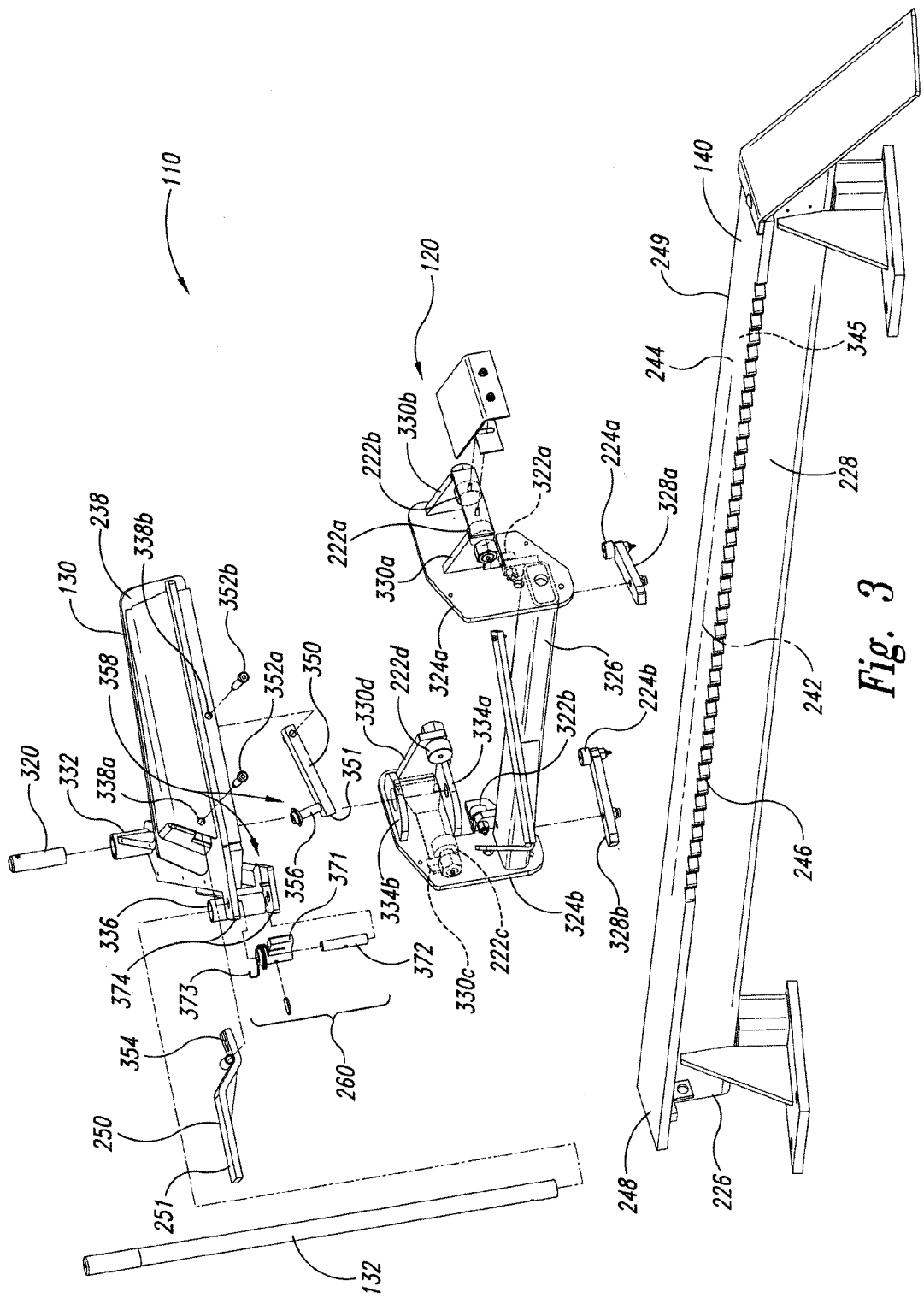
FIG. 3 is an exploded isometric view of the wheel chock of FIG. 1.

FIG. 3 is an exploded isometric view of the wheel chock 110 illustrating various features of the system in more detail. In one aspect of this embodiment, the carriage 120 includes a first end plate 324a and a second end plate 324b welded or otherwise fixedly attached to opposite ends of a spacer bar 326. The first end plate 324a carries a pair of spaced apart, vertical support plates 330 extending outwardly therefrom (identified individually as a first support plate 330a and a second support plate 330b). The second end plate 324b carries a third vertical support plate 330c extending outwardly therefrom and a fourth vertical support plate 330d extending inwardly therefrom. In addition, the inboard side of the second end plate 324b also carries a pair of vertically-spaced apart lugs 334a and 334b.

As mentioned above, the carriage 120 includes a plurality of rollers that support the carriage 120 on the rail 140 and enable the carriage to roll back and forth along the longitudinal axis 242. More particularly, in the illustrated embodiment the first top roller 222a and the second 222b are rotatably mounted to the first support plate 330a and a second support plate 330b, respectively. Similarly, the third top roller 222c is rotatably mounted to the third support plate 330c, and the fourth top roller 222d is rotatably mounted to the fourth support plate 330d. Each of the outboard side rollers 224 is rotatably mounted to a distal end portion of a corresponding support arm 328 that is bolted or otherwise attached to an underside portion of the spacer bar 326. In the illustrated embodiment, the support arms 328 are adjustable relative to the spacer bar 326 so that the position of the side rollers 224 relative to the side surface 228 of the rail beam 226 can be adjusted. In addition to the top rollers 222 and the outboard side rollers 224, a first bottom roller 322a and a second bottom roller 322b are rotatably mounted to stanchions or risers extending upwardly from an inboard side portion of the spacer bar 326. The bottom rollers 322 are positioned to roll against a bottom surface 345 of the rail top plate 248. As described in greater detail below, the carriage 120 can also include one or more inboard side rollers (not shown in FIG. 3) configured to roll against the inboard edge portion 249 of the top plate 248.

The restraint arm 130 includes a locking mechanism 358 comprised of a lock member 350 and the release pedal 250. The release pedal 250 is pivotally coupled to an upper housing on the wheel stop 238 by a first pivot pin 352a that extends through a first pin bore 338a. The lock member 350 is pivotally coupled toward the underside of the wheel stop 238 by a second pivot pin 352b that extends through a second pin bore 338b. A lift pin 356 extends upwardly from a distal end portion 351 of the lock member 350, and is operably coupled to a forked end portion 354 of the release pedal 250 in a "knife-and-fork" arrangement. As described in greater detail below, when the operator depresses a pedal pad 251 on the release pedal 250, the forked end portion 354 pivots upwardly, thereby engaging the lift pin 356 and moving the distal end portion 351 of the locking member 350 away from the inboard edge portion 249 of the rail top plate 248, and releasing the restraint arm 130 from the rail 140. Because the pedal pad 251 is positioned further away from the first pivot pin 352a than the forked end portion 354, the release pedal 250 acts like a torque multiplying arm that multiplies the upward force on the lift pin 356 generated by the operator. This feature can facilitate relatively easy disengagement of the restraint arm 130 from the rail 140, even when there is substantial friction in the system from, for example, a trailer or other vehicle under restraint.

The restraint arm 130 is pivotally coupled to the carriage 120 by a pivot pin 320 that extends through a bearing tube 332 and the spaced apart lugs 334. An end portion of the operating handle 132 is fixedly received in a socket 336 on the restraint arm 130 proximate the ratchet 260. The ratchet 260 includes a pawl 371 pivotally attached to spaced apart lugs 374 on the restraint arm 130 by a pivot pin 372 that extends through a pivot bore thereof. A torsion spring 373 operably engages the pawl 371 and the distal end of base 240 to apply a torsional force to the pawl 371 that urges the pawl 371 toward the teeth 246 on the rail top plate 248.

The various portions of the carriage 120, the restraint arm 130, and the guide rail 140 described above can be formed from various types of suitable materials known in the art, including various types of structural steel plate and/or other metals suitable for welding and/or bolting together. Accordingly, in one embodiment the respective parts described above can be welded to each other using suitable materials and methods known in the art. In other embodiments, various portions of the wheel chock 110 can be machined, cast, forged, bolted together, and/or otherwise formed in other suitable ways known in the art.

Figure 4A:
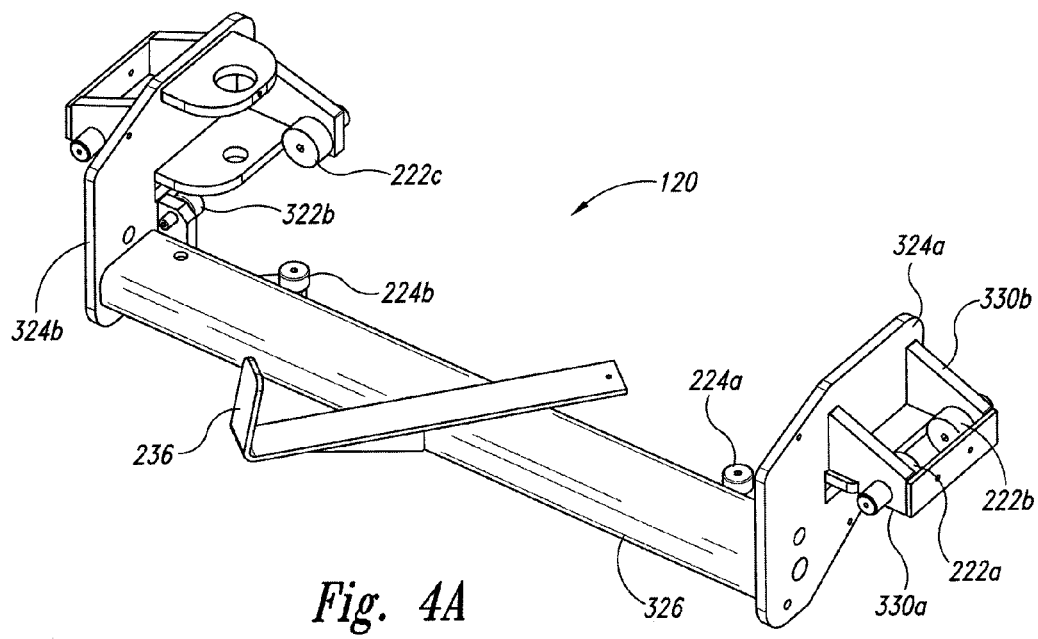
FIG. 4A is an enlarged isometric view of a wheel chock carriage configured in accordance with an embodiment of the disclosure.
Figure 4B:
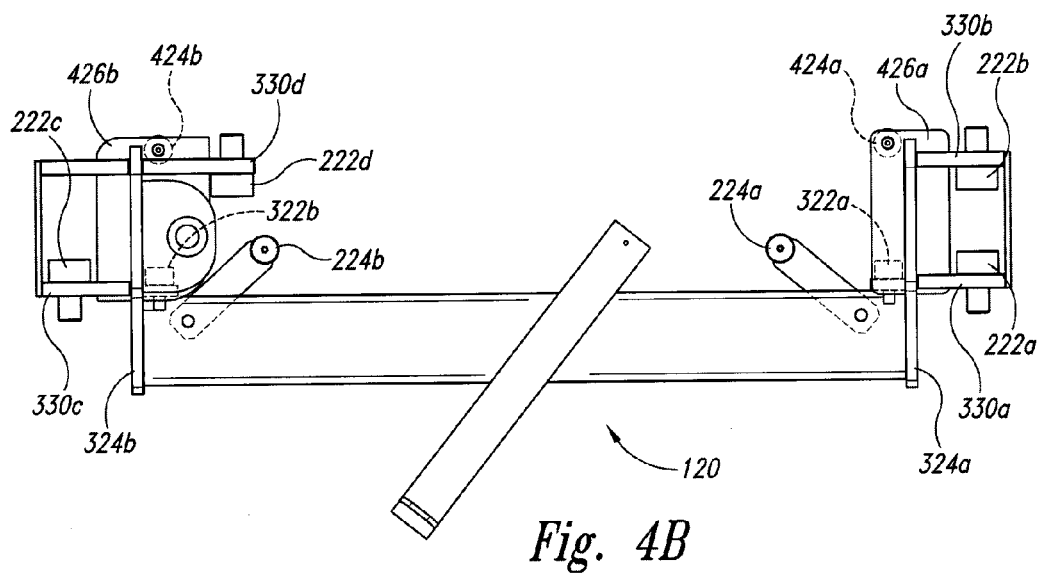
FIG. 4B is a top view of the wheel chock carriage.

FIGS. 4A and 4B are isometric and top views, respectively, of the carriage 120 illustrating the relative positions of the carriage rollers in more detail. For example, these views illustrate the relative positions of the top rollers 222a-d, the outboard side rollers 224a, b, and the bottom rollers 322a, b. In addition, as shown in FIG. 4B, a first inboard side roller 424a is rotatably mounted to an underside of a first horizontal support plate 426a adjacent the first end plate 324a, and a second inboard side roller 424b is similarly mounted to an underside of a second horizontal support plate 426b adjacent the second end plate 324b. As mentioned above, the inboard side rollers 424 are configured to roll against an inboard edge portion 249 of the rail top plate 248. Accordingly, in the illustrated embodiment the top rollers 222 and the bottom rollers 322 are configured to roll about central axes that extend perpendicular to the longitudinal axis 242 and are at least generally parallel to the top surface 244 of the rail top plate 248 (FIG. 3), and the outboard side rollers 224 and the inboard side rollers 424 are configured to roll about central axes that extend perpendicular to the longitudinal axis 242 and are at least generally perpendicular to the top surface 244. The rollers 222 and 224 can include various types of suitable rollers, including steel rollers, hard rubber rollers, and/or other suitable industrial rollers known in the art.

Figure 5:
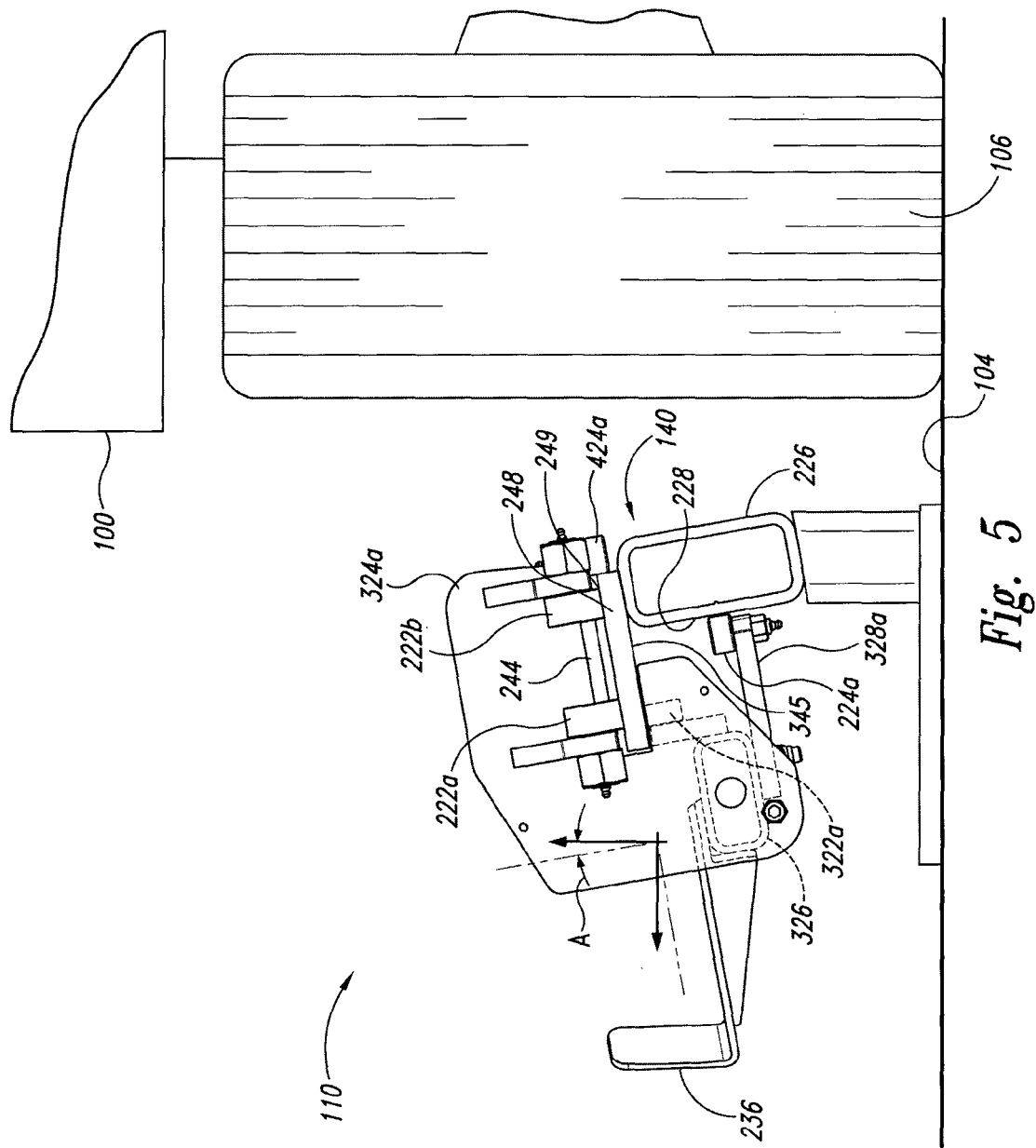
FIG. 5 is an enlarged end view of the wheel chock of FIG. 1 operably mounted to a guide rail configured in accordance with an embodiment of the disclosure.

FIG. 5 is an enlarged end view of the wheel chock 110 illustrating the operational relationship between the rollers 222, 224 and the guide rail 140 in accordance with an embodiment of the disclosure. The restraint arm 130 is not shown in FIG. 5 for purposes of clarity. As this view illustrates, the top rollers 222 are configured to roll on the top surface 244 of the rail top plate 248, and the bottom rollers 322 are configured to roll on the bottom surface 345. In addition, the outboard side rollers 224 are configured to roll against the outboard side surface 228 of the rail beam 226, and the inboard side rollers 424 are configured to roll against the inboard edge portion 249 of the top plate 248.

In one aspect of this embodiment, the guide rail 140 is positioned at a slight angle away from the trailer 100. More specifically, in the illustrated embodiment the rail support beam 226 and the top plate 248 are set at an angle A of from about 5 degrees to about 20 degrees, or about 10 degrees away from the trailer 100. Angling the guide rail 140 away from the trailer 100 in this manner positions the carriage 120 away from the trailer wheels 106. This enables the carriage 120 to travel the length of the guide rail 140 without rubbing against the trailer wheels 106, even if the wheels 106 contact the rail 140. Another feature of this embodiment is that the angle A facilitates the shedding of water, snow, and/or other debris from the top surface 244 of the guide rail 140. The angle A also provides a slight incline to the pivot axis 234 that allows gravity to assist disengagement of the restraint arm 130 from the trailer wheels 106 when the operator retracts the restraint arm 130, as well as promoting a higher engagement height of the wheel stop 238 on the trailer wheel 106. As those of ordinary skill in the art will appreciate, the wheel chock 110 described herein can be arranged in either a left or right hand configuration for use on either side of the trailer 100 without departing from the spirit or scope of the present disclosure.

Figure 6A:
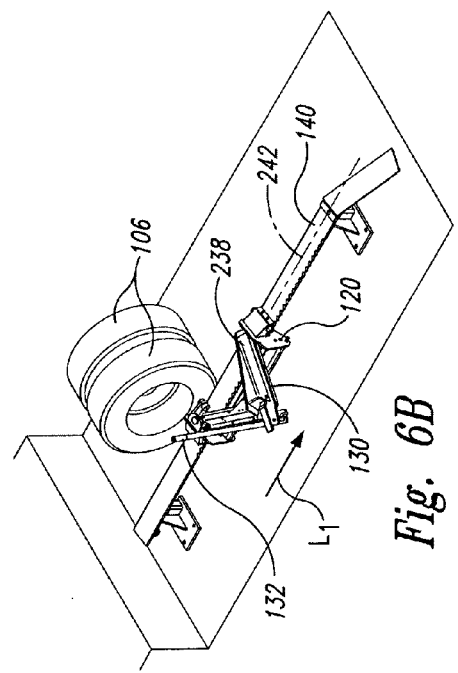
FIGS. 6A-6D are a series of isometric views illustrating various stages in a method of operating the wheel chock of FIG. 1 in accordance with an embodiment of the invention.
Figure 6B:
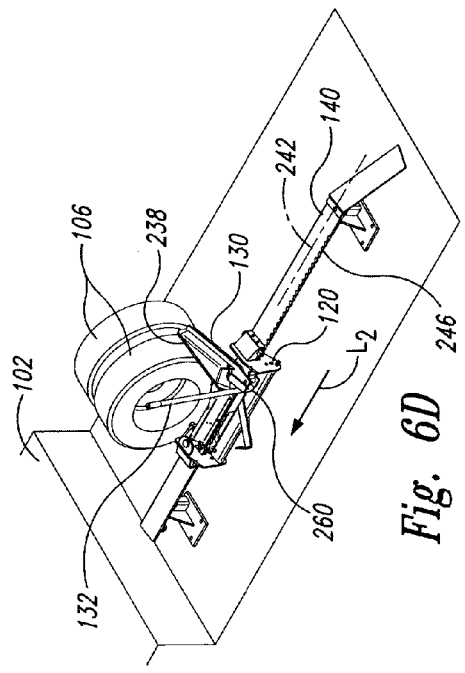
Figure 6C:
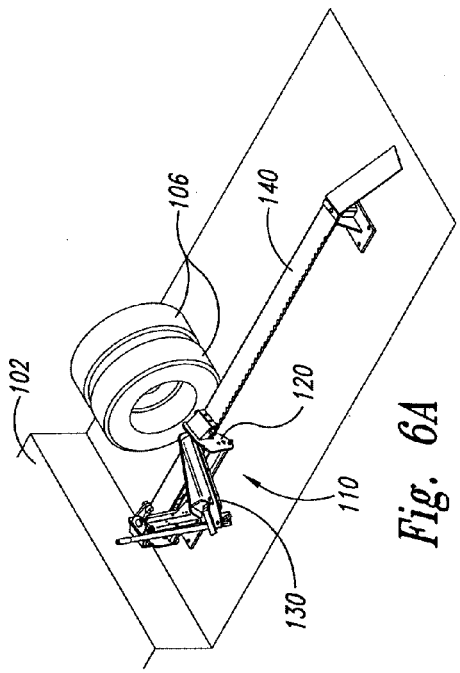

FIGS. 6A-6D are a series of top isometric views illustrating operation of the wheel chock 110 in accordance with an embodiment of the disclosure. In FIG. 6A, the trailer has been positioned in front of the loading dock 102 with the rear wheels 106 positioned adjacent to the guide rail 140. The restraint arm 130 is retracted away from the wheels 106 at this time. As shown in FIG. 6B, the operator (not shown) grasps the control handle 132 and rolls the carriage 120 away from the loading dock 102 in a forward direction $L_1$ along the longitudinal axis 242 until the wheel stop 238 is positioned forward of the tires 106. The operator then pushes the handle 132 toward the rail 140, causing the restraint arm 130 to rotate inwardly in direction $R_1$ about the pivot axis 234, as shown in FIG. 6C. Moving the restraint arm 130 to this position releasably locks the restraint arm 130 to the rail 140, thereby preventing lateral movement of the restraint arm 130 relative to the longitudinal axis 242. The operator, however, is still able to roll the carriage 120 aft along the longitudinal axis 242 in a rearward direction $L_2$ until the wheel stop 238 contacts the wheels 106, as shown in FIG. 6O. As described in greater detail below, when the restraint arm 130 is engaged with the rail 140, the ratchet 260 operably engages the teeth 246 and prevents the carriage 120 from moving away from the wheels 106 in the forward direction $L_1$ more than a relatively small distance, such as about 4 inches or less.

Figure 7A:
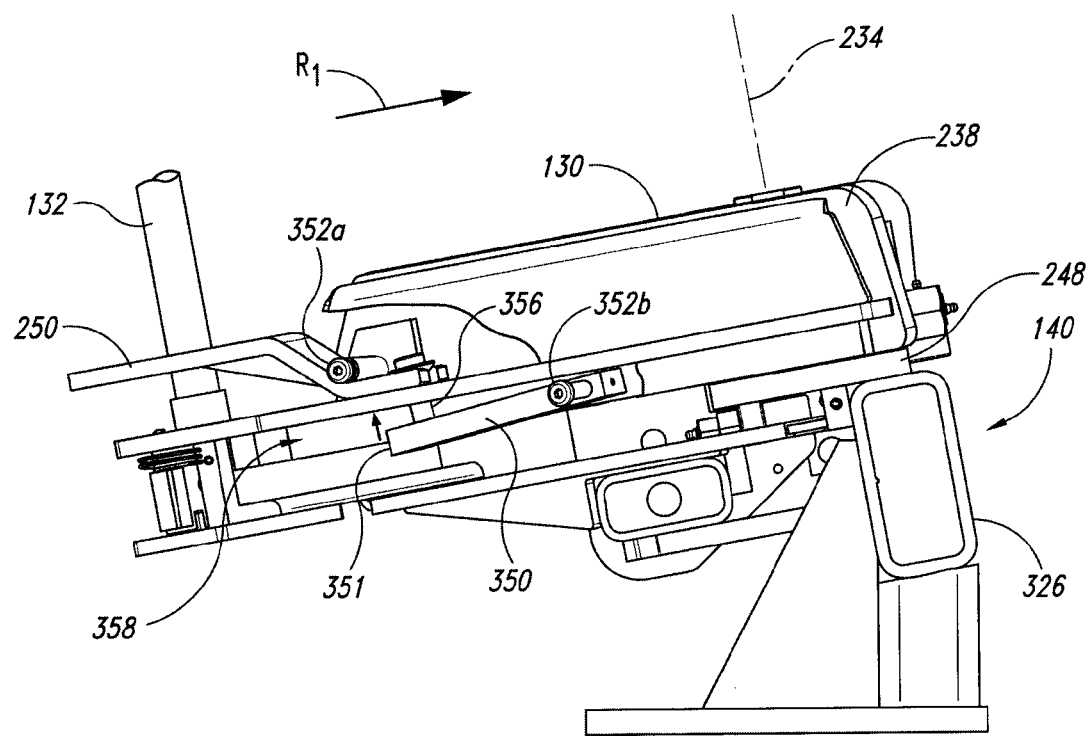
FIGS. 7A-7D are a series of end views of the wheel chock illustrating various stages of operation of a restraint arm as it engages the guide rail in accordance with an embodiment of the disclosure.
Figure 7B:
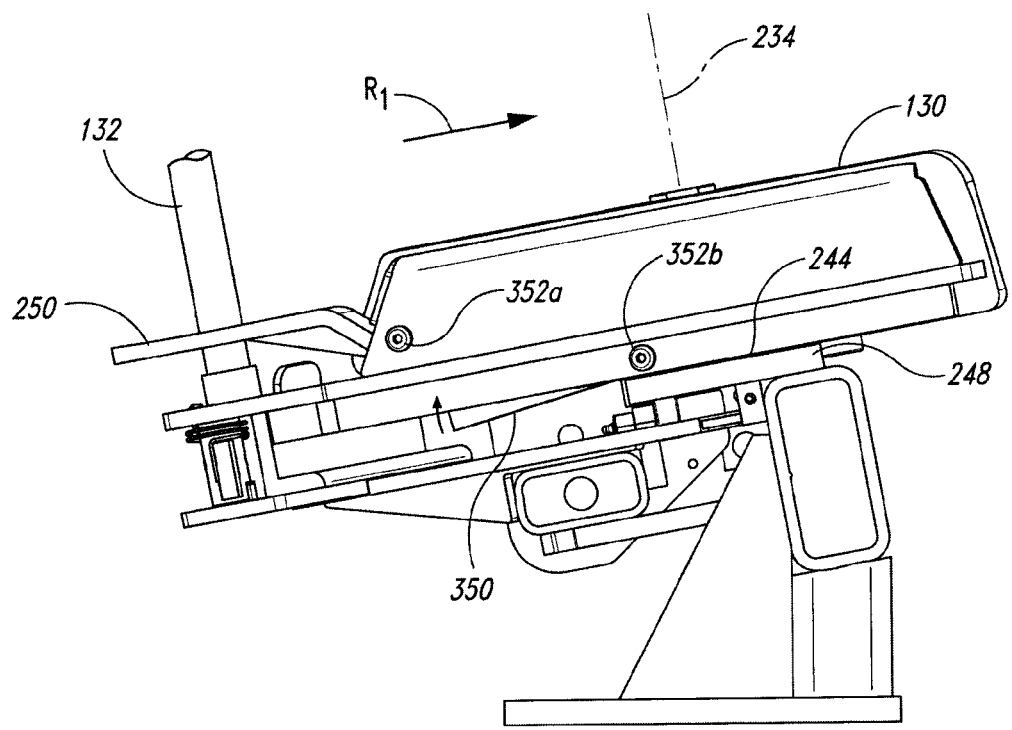

FIGS. 7A-7D are a series of end views of the wheel chock 110 illustrating various stages of operation of the restraint arm locking mechanism 358. In FIG. 7A, the restraint arm 130 is retracted against the arm stop 236 (FIG. 2A). In this position, the distal end portion 351 of the lock member 350 hangs down from the wheel stop 238 and holds the release pedal 250 in the upper position shown. To position the wheel stop 238 in front of a trailer wheel and engage the restraint arm 130 with the rail 140, the operator grasps the handle 132 and rotates the restraint arm 130 in the direction $R_1$ about the pivot axis 234. As shown in FIG. 7B, as the restraint arm 130 moves across the top plate 248, the lock member 350 contacts the top surface 244 and rotates upwardly about the second pivot pin 352b.

Figure 6D:
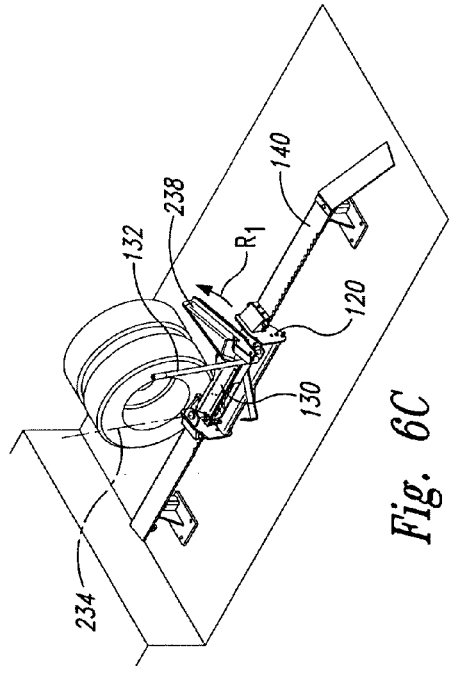
Figure 7C:
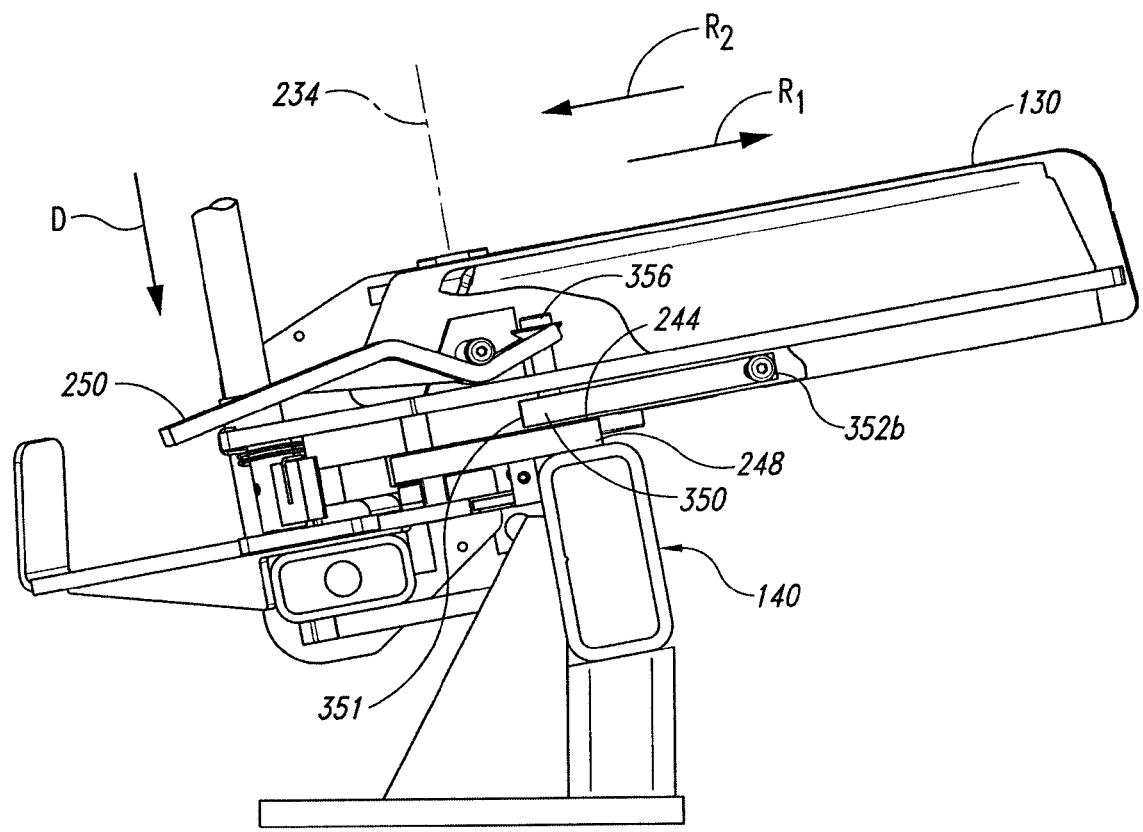
Figure 7D:
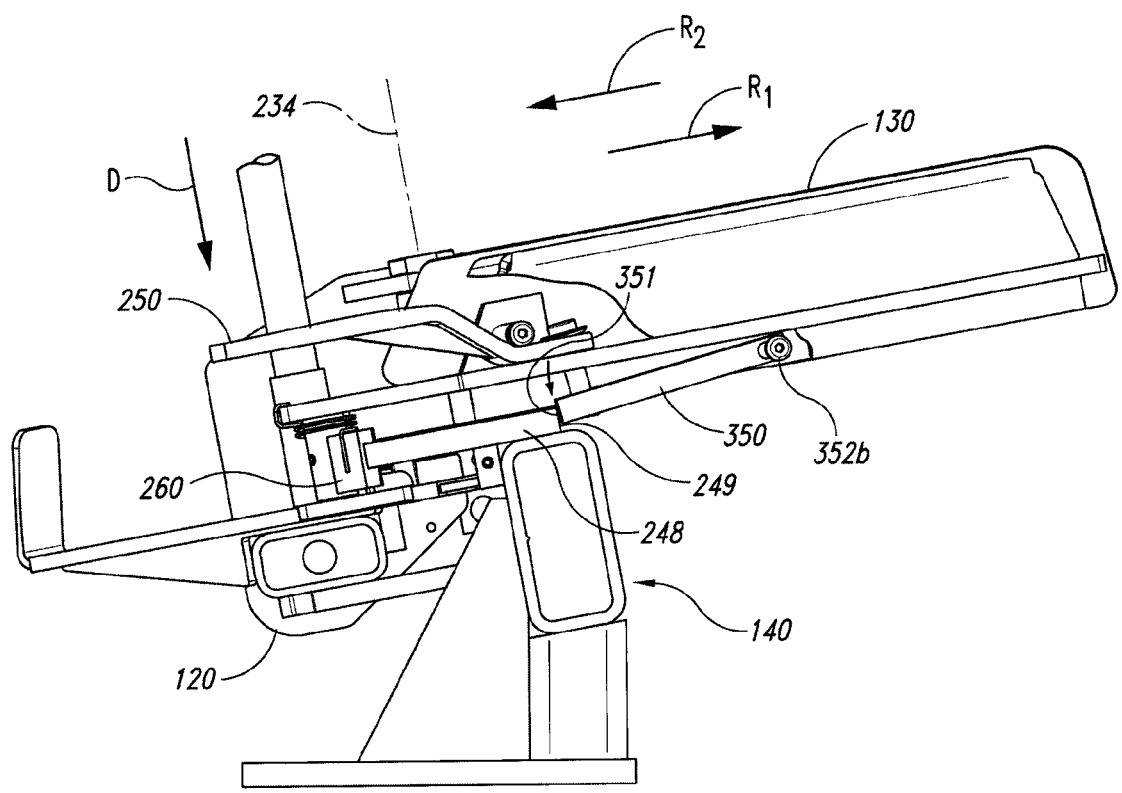

Referring next to FIG. 7C, continued rotation of the restraint arm 130 in the direction $R_1$ causes the lock member 350 to continue sliding over the top surface 244 of the top plate 248. As shown in FIG. 7D, as the restraint arm 130 approaches the limit of its inward rotational movement in the direction $R_1$, the distal tip portion 351 of the lock member 350 drops down adjacent to the inboard edge portion 249 of the top plate 248. In this position, the distal tip portion 351 of the lock member 350 opposes the inboard edge portion 249 and prevents retraction of the restraint arm 130 in the second direction $R_2$ about the pivot axis 234. Moreover, further rotation of the restraint arm 130 in the first direction $R_1$ is limited by the ratchet 260. As discussed elsewhere herein, however, the carriage 120 is still able to move longitudinally along the rail 140 in the rearward direction $L_2$ (FIG. 6D).

To release the restraint arm 130 from the rail 140, the operator depresses the release pedal 250 downward in direction D. As shown in FIG. 7C, this raises the lift pin 356, which in turn raises the distal tip portion 351 of the lock member 350 away from the inboard edge portion 249 of the top rail 248. This allows the restraint member 130 to be rotated away from the guide rail 140 in the second direction $R_2$.

Figure 8A:
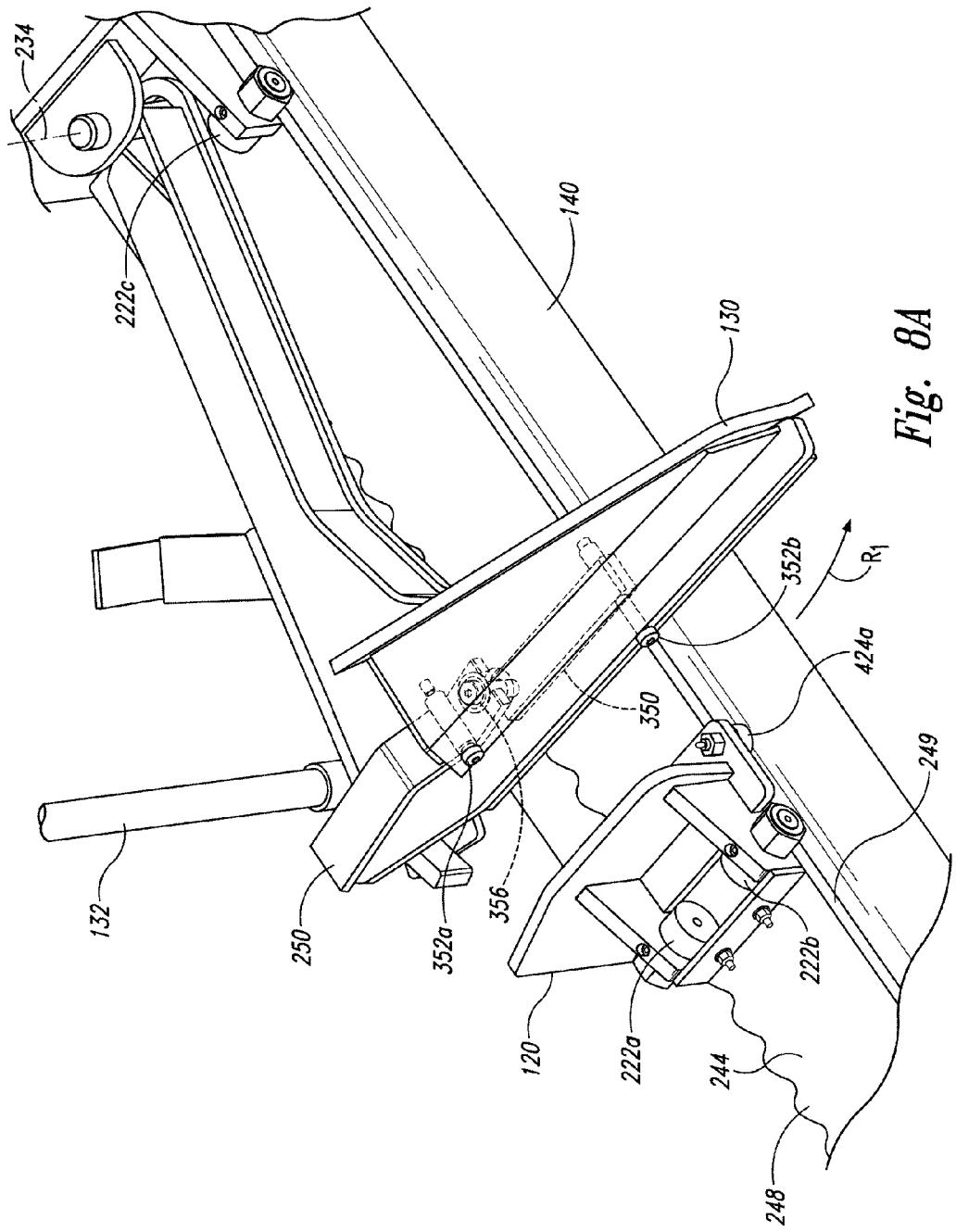
Figure 8B:
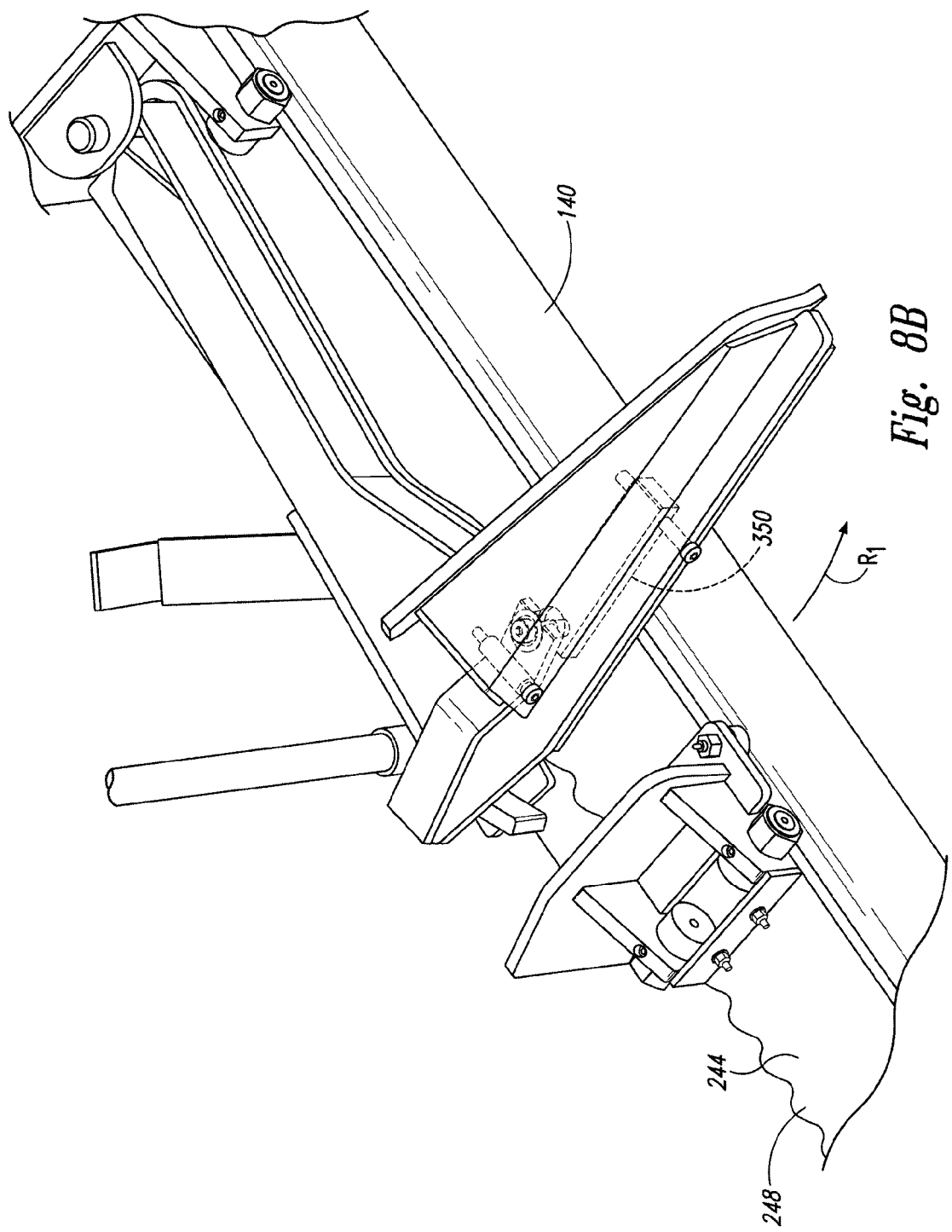

FIGS. 8A-8F are a series of partially transparent isometric views of a portion of the wheel chock 110 illustrating a number of the operational aspects of the wheel chock described above in more detail. FIG. 8A, for example, illustrates the relative positioning of the carriage top rollers 222a-c on the top surface 244 of the top plate 248. This Figure also illustrates the position of the first inboard side roller 424a relative to the inboard edge portion 249 of the top plate 248. Referring next to FIGS. 8A-8C together, these views illustrate how the lock member 350 slides across the top surface 244 of the top plate 248 as the restraint arm 130 rotates in the direction $R_1$ about the pivot axis 234.

Figure 8D:
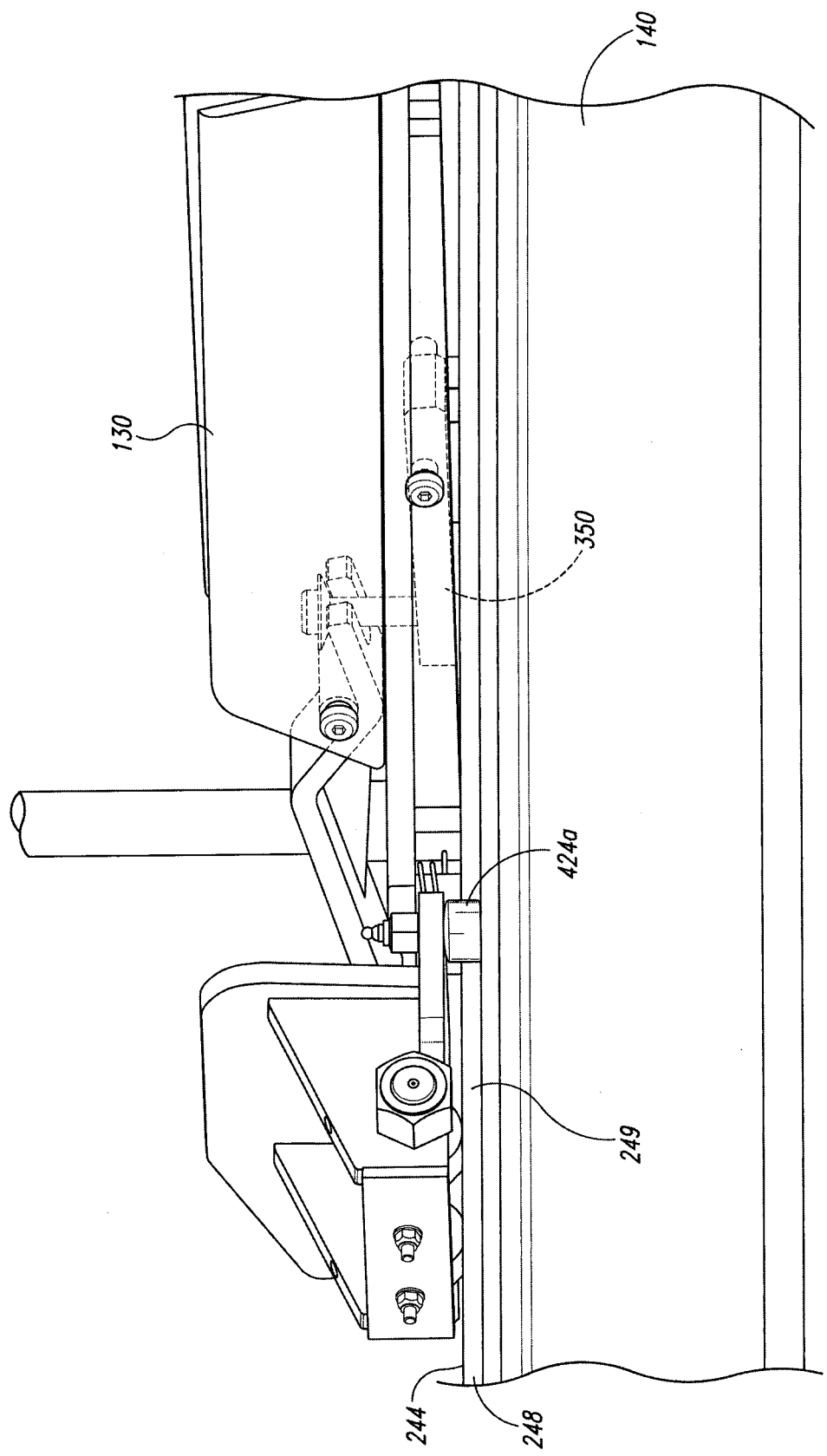

FIG. 8D is an isometric side view looking outward toward the inboard side surface of the guide rail 140. Like FIG. 8A, this view illustrates the relative position of the first inboard side roller 424a relative to the inboard edge portion 249 of the top plate 248. This view also illustrates the position of the lock member 350 just before it drops down to engage the inboard edge portion 249.

Figure 8E:
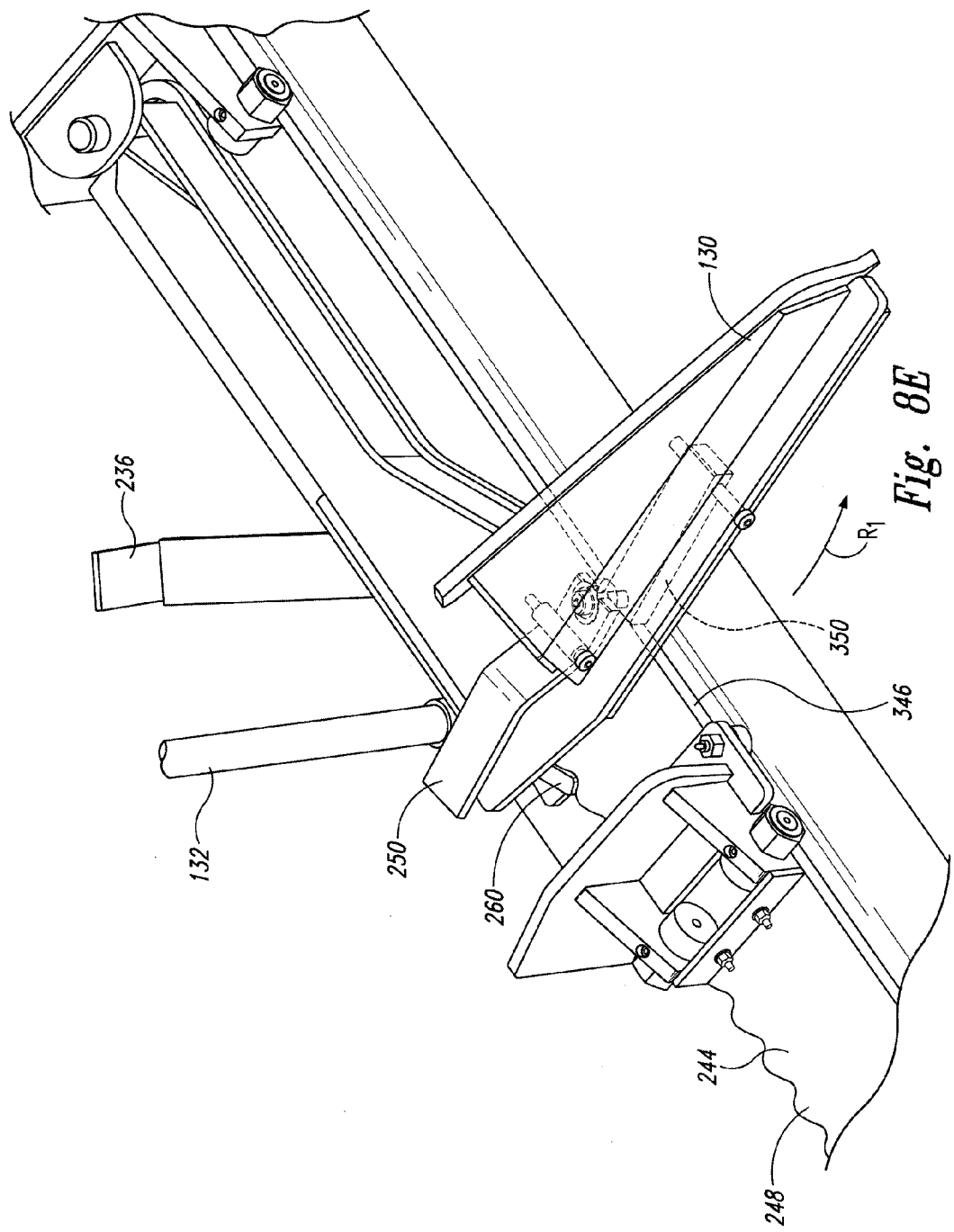
Figure 8F:
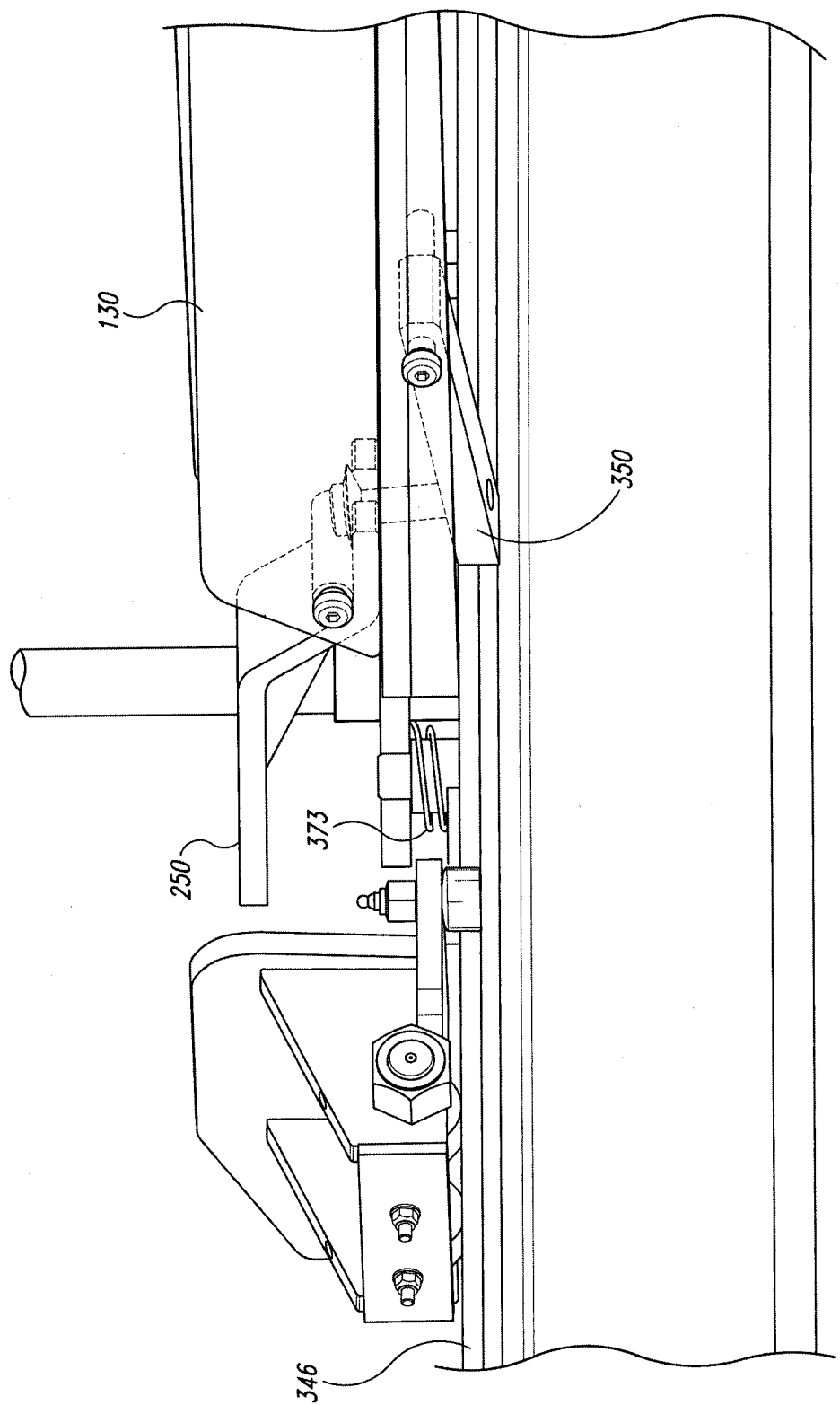

Referring next to FIGS. 8E and 8F together, as the restraint arm 130 approaches the end of its inboard rotation in the direction $R_1$, the lock member 350 drops downwardly and engages the top plate 248 as described above. The restraint member 130 is then engaged with the top plate 248 by the ratchet 260 on one side and the lock member 350 on the other. As discussed in detail above, the lock member 350 can be disengaged from the top plate 348 to release the restraint arm 130 by depressing the release pedal 250 and moving the handle 132 back toward the arm stop 236.

In other embodiments, the release pedal 250 can be omitted and the lock member 350 or a similar locking device can be operated by means of the operating handle 132 (FIGS. 1 and 8A). In one other embodiment, for example, the operating handle 132 can be configured to pivot outwardly a set amount about its base (proximate the socket 336) to raise the lock member 350 from the inboard edge portion 249 of the rail top plate 248 and release the arm 130 from the rail 140. This enables positive lifting and release of the locking mechanism to occur in one motion as the operator pulls back on the operating handle 132 to retract the arm 130. Conversely, the operating handle 132 can also be configured to pivot inwardly (i.e., toward the guide rail 140) a set amount and allow the lock member 350 to engage the inboard edge portion 249 of the rail top plate 248 as the operator pushes the operating handle 132 toward the guide rail. Operably coupling the lock member 350 to the operating handle 132 in this manner enables the operator to manually engage and disengage the lock member by simple manipulation of the operating handle 132. As the foregoing discussion illustrates, the wheel chock 110 described herein can include a number of different types of arm locking/release mechanisms.

Figure 9:
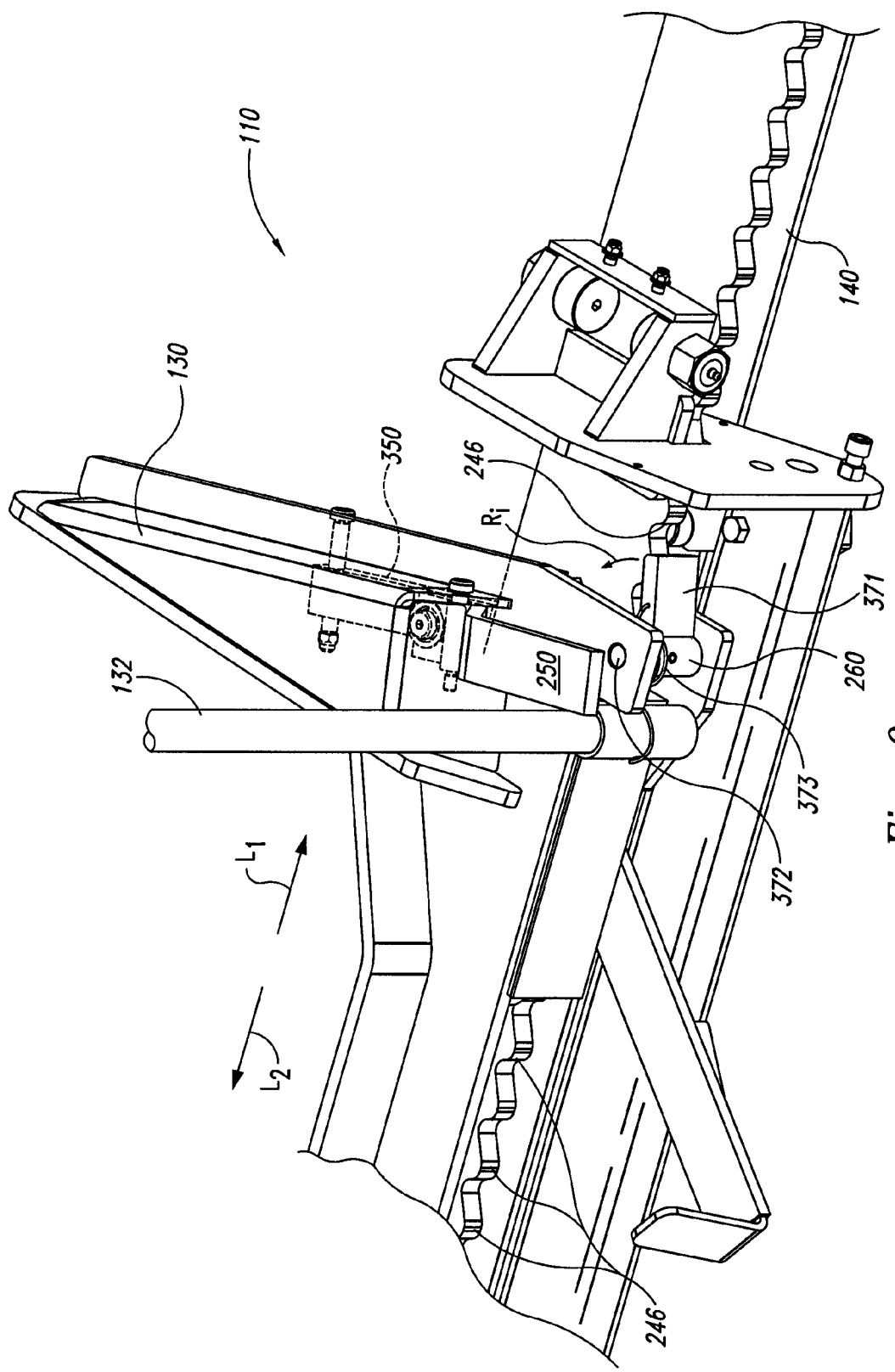
FIG. 9 is an enlarged isometric view of a portion of the wheel chock illustrating various aspects of a restraint arm ratchet configured in accordance with an embodiment of the disclosure.

FIG. 9 is a partially transparent, top isometric view of a portion of the wheel chock 110 with the restraint arm 130 engaged with the guide rail 140. In this position, the torsion spring 373 biases or urges the pawl 371 inwardly in direction $R_i$ against the teeth 246 of the top plate 248. As a result, the pawl 371 rides over the teeth 246 when the restraint arm 130 is moved in the second or rearward direction $L_2$ along the longitudinal axis 242 (FIG. 2A) of the guide rail 140. However, when the restraint arm 130 is moved in the opposite or forward direction $L_1$ (by, for example, a trailer wheel), the pawl 371 engages the teeth 246 and restricts further movement of the restraint arm 130 in that direction to less than, for example, about 4 inches. As explained above, when the release pedal 250 is depressed the restraint arm 130 can be retracted away from the guide rail 140 to disengage the pawl 371 from the teeth 246. The carriage 120 is then free to roll back and forth on the guide rail 140.

In other embodiments, the carriage 120 can be temporarily locked into position on the guide rail 140 using other mechanisms. For example, in other embodiments the latch pawl/teeth combination described above can be replaced by a linear brake, such as friction brake, that mounts to the carriage 120. The friction brake can be manually or otherwise actuated to act against a braking surface on the top plate 248 or other surface of the guide rail 140 to hold the carriage 120 in position at a desired location. Moreover, the brake can be configured so that the application of force against the wheel stop 120 (by, for example, a vehicle wheel) can increase the locking force applied by the brake. As the foregoing discussion illustrates, the present disclosure is not limited to a particular type of carriage/wheel stop locking mechanism or system, but can include other types of suitable carriage/wheel stop locking mechanisms and systems.

FIG. 10A is an isometric view of a wheel chock 1010 having a restraint arm cam adjuster 1070 configured in accordance with an embodiment of the disclosure. Many features of the wheel chock 1010 are at least generally similar in structure and function to corresponding features of the wheel chock 110 described in detail above. For example, the wheel chock 1010 includes a restraint arm 1030 pivotally coupled to a carriage 1020. The carriage 1020 is movably coupled to a longitudinal guide rail 1040, and is configured to travel back and forth on the guide rail 1040 along a longitudinal axis 1042. As with the wheel chock 110, an operator can push on a handle 1032 to rotate the restraint arm 1030 in a first direction R1 to position a wheel stop 1038 in front of a wheel (e.g., a trailer wheel—not shown) to restrain the trailer adjacent to the guide rail 1040. Conversely, the restraint arm 130 can be moved away from the wheel in a second direction R2 by pulling on the operating handle 1032. The wheel chock 110 of FIG. 1 is configured for use on one side of the trailer 100 (FIG. 1), and the wheel chock 1010 of FIG. 10A is configured for use on the opposite side of the trailer. Accordingly, the wheel chocks described herein can be configured for use on either side of a vehicle.

FIG. 10B is an enlarged view of a portion of the wheel chock 1010 illustrating the pivotal connection between the restraint arm 1030 and the carriage 1020 in more detail. Like the restraint arm 130 of the wheel chock 110, the restraint arm 1030 is pivotally attached to the carriage 1020 by means of a pivot pin (not shown in FIG. 10A or 10B) that is supported by a first or upper lug 1035a and a second or lower lug 1035b. As described in greater detail below, however, in this particular embodiment the upper end of the pivot pin is received in an offset bore of the cam adjuster 1070. Accordingly, the cam adjuster 1070 can be rotated in its bore to angle the pivot pin (and a corresponding pivot axis 1034) relative to the guide rail 1040. This enables the height and/or pitch of the restraint arm 1030 to be adjusted during or after assembly for reduced drag, ease of operation and optimum performance. Once the cam adjuster 1070 has been rotated into a desired position, it can be locked into position with a locking feature (e.g., a lock screw) 1072 that bears against the cam adjuster 1070 when tightened.

Figure 11A:
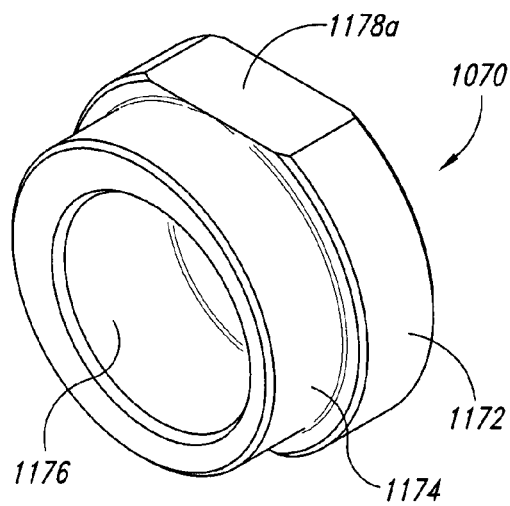
FIGS. 11A-11D are a series of isometric, end, side and front views, respectively, of the cam adjuster of FIGS. 10A and 10B.
Figure 11B:
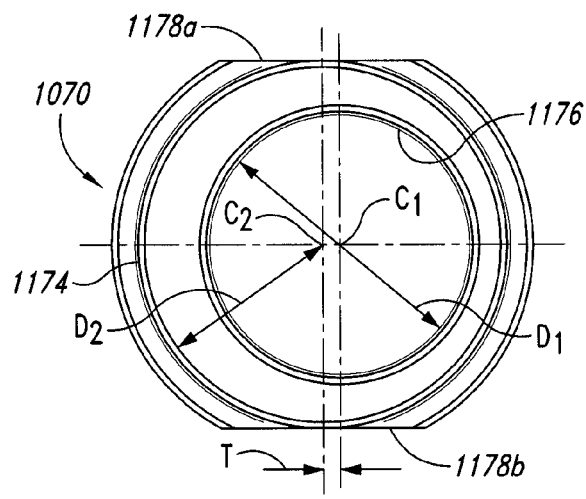
Figure 11C:
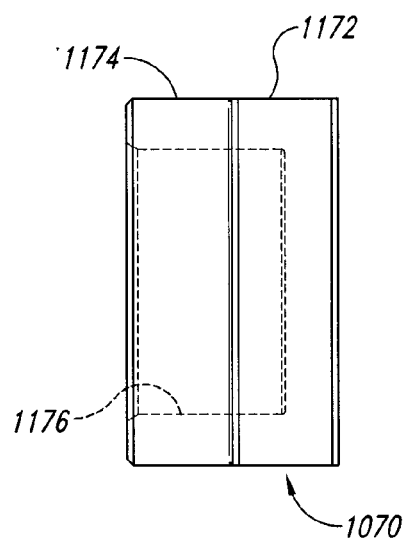
Figure 11D:
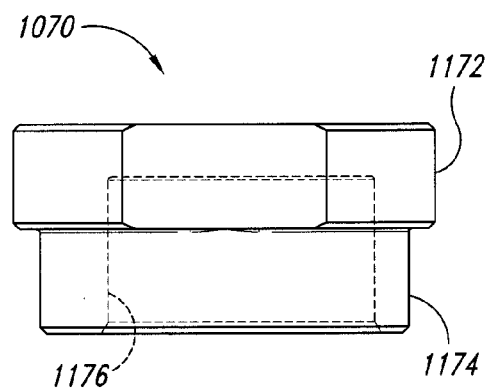

FIG. 11A is an enlarged isometric view of the cam adjuster 1070 configured in accordance with an embodiment of the disclosure, and FIGS. 11B-11D are corresponding end, side and front views, respectively, of the cam adjuster 1070. Referring to FIGS. 11A-11D together, the cam adjuster 1070 includes a cylindrical socket portion 1174 extending from a slightly larger head portion 1172. The head portion 1172 can include a plurality of flats 1178a and 1178b to facilitate gripping and turning of the cam adjuster 1070 with a wrench or other suitable tool.

Figure 12:
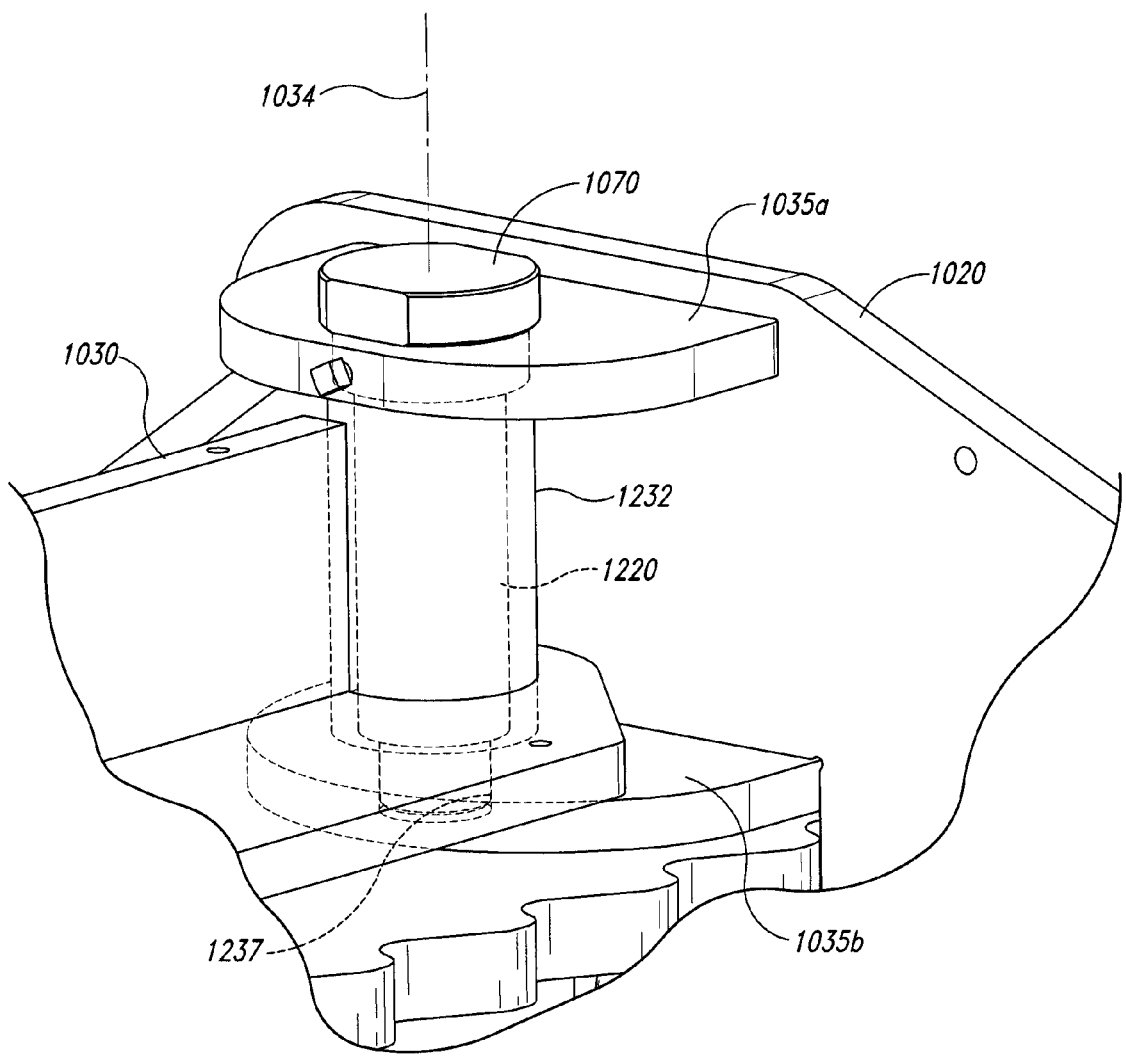
FIG. 12 is an enlarged isometric view illustrating the assembly of a restraint arm pivot pin with the cam adjuster of FIGS. 11A-11D in accordance with an embodiment of the disclosure.

The socket portion 1174 includes an offset pin bore 1176 configured to receive an end portion of the restraint arm pivot pin (FIG. 12). As illustrated in FIG. 11B, the pin bore 1176 has a first diameter $D_1$ and the socket portion 1174 has an external diameter $D_2$. Moreover, the pin bore 1176 has a first center $C_1$ that is offset from a second center $C_2$ of the socket portion 1174 by an offset distance T. Accordingly, when the socket portion 1174 is rotated in its bore in the upper lug 1035a (FIGS. 10A and 10B), the first center $C_1$ of the pin bore 1176 describes a circular path about the second center $C_2$ of the socket portion 1174.

FIG. 12 is an enlarged isometric view of a portion of the wheel chock 1010 illustrating the assembly of the restraint arm 1030 to the carriage 1020 in more detail. As this view illustrates, a pivot pin 1220 extends through a bearing tube 1232 located at the proximal end portion of the restraint arm 1030. A first end of the pivot pin 1220 is received in a corresponding bore 1237 formed in the lower lug 1035b. The opposite end of the pivot pin 1220 is received in the offset pin bore 1176 of the cam adjuster 1070 (FIGS. 11A-11D). In the illustrated embodiment, there is enough clearance between the pivot pin 1220 and the respective bores 1176 and 1237 to accommodate the angular movement of the pivot pin 1220 resulting from rotation of the cam adjuster 1070.

Returning to FIGS. 10A and 10B, an operator or installer wishing to adjust the position or attitude of the restraint arm 1030 and/or the wheel stop 1038 relative to the guide rail 1040 and/or a vehicle wheel loosens the locking feature 1072 so that the cam adjuster 1070 can be rotated in its bore in the upper lug 1035a with a wrench or other suitable tool. As the cam adjuster 1070 is rotated, the pivot pin 1220 (and hence the pivot axis 1034) tilts about the pin bore 1237 in the lower lug 1035b and describes a conical path. Tilting of the pivot axis 1034 alters the orientation of the restraint arm 1030 relative to the carriage 1020 and, accordingly, the guide rail 1040. For example, the cam adjuster 1070 can be rotated to pivot the wheel stop 1038 upwardly or downwardly in a first arc $A_1$ about the longitudinal axis 1042 of the guide rail 1040. Similarly, the cam adjuster 1070 can also be rotated to a different position to raise or lower the restraining arm 1032 in a second arc $A_2$ about a transverse axis 1046 extending perpendicular to the longitudinal axis 1042. As mentioned above, the ability to fine tune the angle and/or height of various portions of the restraining arm 1030 and/or the wheel stop 1038 can reduce interference/friction during operation of the restraint arm 1030 and facilitate smooth and efficient operation of the wheel chock 1010.

One advantage of embodiments of the wheel chock 110 described above is that the length of the guide rail 140 can be easily customized to meet the needs of a particular operator or a particular type of trailer. In addition, various embodiments of wheel chock 110 can include heating elements, such as electrical heating elements to reduce the buildup of ice or snow in the winter. The wheel chock 110 can also include sensors located on the restraint arm 130 and/or the home position of the rail 140 to determine when the carriage 120 is stored in the home position, or when the restraint arm 130 has been properly engaged with a trailer tire. Moreover, the sensors of this embodiment can be operably connected to dock lights or other signaling systems to signal to the driver or operator whether the trailer is restrained or not.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A wheel chocking system for use at a loading dock, the wheel chocking system comprising:
a guide rail positionable on a parking surface in front of the loading dock, a wheel chock including:
a carriage movably coupled to the guide rail and configured to move fore and aft along a longitudinal axis parallel to the guide rail; and
a restraint arm pivotally coupled to the carriage and configured to rotate about a pivot axis extending generally perpendicular to the longitudinal axis, wherein the restraint arm is rotatable in a first direction about the pivot axis to move a wheel stop away from a wheel of a vehicle parked adjacent the guide rail, and wherein the restraint arm is further rotatable in a second direction opposite to the first direction to move the wheel stop in front of the wheel of the vehicle, wherein the guide rail includes a row of teeth, wherein the restraint arm includes a ratchet having a spring-loaded pawl that engages at least one of the teeth when the restraint arm is rotated about the pivot axis in the second direction, and wherein engagement of the teeth by the pawl prevents the restraint arm from moving away from the loading dock along the longitudinal axis.

2. The wheel chocking system of claim 1 wherein the restraint arm includes a releasable locking mechanism that engages the guide rail when the restraint arm is rotated about the pivot axis in the second direction.

3. The wheel chocking system of claim 1 wherein the restraint arm includes a releasable locking mechanism that engages the guide rail when the restraint arm is rotated about the pivot axis in the second direction, and wherein engagement of the guide rail by the locking mechanism prevents the restraint arm from rotating away from the guide rail about the pivot axis in the first direction.

4. The wheel chocking system of claim 1 wherein the restraint arm includes a releasable locking mechanism that engages the guide rail when the restraint arm is rotated about the pivot axis in the second direction, and wherein engagement of the guide rail by the locking mechanism maintains the pawl in contact with the teeth.

5. The wheel chocking system of claim 1 wherein engagement of the teeth by the pawl prevents the restraint arm from moving away from the loading dock along the longitudinal axis while permitting the restraint arm to move toward the loading dock along the longitudinal axis.

6. The wheel chocking system of claim 1 wherein the wheel chock further includes a releasable locking mechanism that engages the restraint arm with the guide rail when the restraint arm is rotated about the pivot axis in the second direction, and wherein engagement of the restraint arm with the guide rail prevents the restraint arm from rotating away from the guide rail in the first direction and from moving away from the loading dock along the longitudinal axis.

7. The wheel chocking system of claim 1 wherein the wheel chock further includes:
a locking member pivotally coupled to the restraint arm, wherein the locking member engages the guide rail when the restraint arm is rotated about the pivot axis in the second direction, and wherein the locking member disengages the guide rail and allows the restraint arm to rotate away from the guide rail in the first direction when the locking member is acted upon by a torque multiplying release arm.

8. The wheel chocking system of claim 1 wherein the wheel chock further includes:
a locking member pivotally coupled to the restraint arm, wherein the locking member releasably engages the guide rail when the restraint arm is rotated about the pivot axis in the second direction, and wherein engagement of the guide rail by the locking member prevents the restraint arm from rotating away from the guide rail in the first direction,
wherein the spring-loaded pawl is pivotally coupled to the restraint arm, and wherein engagement of one of the teeth by the pawl prevents the restraint arm from moving away from the loading dock along the longitudinal axis while permitting the restraint arm to move toward the loading dock along the longitudinal axis.

9. The wheel chocking system of claim 1 wherein the pivot axis is inclined away from the parking surface to facilitate rotation of the restraint arm in the first direction.

10. A wheel chocking system usable to restrain a trailer at a loading dock, the wheel chocking system comprising:
a guide rail mountable adjacent to a parking surface in front of the loading dock;
a carriage movably mounted to the guide rail and operable to move along a longitudinal axis that extends parallel to the guide rail;
a restraint arm pivotally coupled to the carriage and configured to rotate about a pivot axis between a retracted position and an engaged position, wherein the restraint arm includes a wheel stop configured to extend outwardly from the guide rail and in front of a trailer wheel when the restraint arm is in the engaged position;
a first releasable locking mechanism configured to prevent the restraint arm from rotating away from the trailer wheel about the pivot axis when the restraint arm is in the engaged position; and
a second releasable locking mechanism configured to prevent the restraint arm from moving away from the loading dock along the longitudinal axis when the restraint arm is in the engaged position,
wherein the guide rail includes an upper surface and a side surface, and wherein the carriage is movably engaged with the guide rail by a system of rollers, the system of rollers including one or more top rollers that roll on the upper surface and one or more side rollers that roll on the side surface.

11. The wheel chocking system of claim 10, further comprising:
a signaling system; and
a sensor operably connected to the signaling system and mounted to at least one of the carriage, the restraint arm, and the guide rail, wherein the sensor is configured to activate the signaling system when the wheel stop is properly positioned in front of the vehicle wheel.

12. A wheel chocking system usable to restrain a trailer at a loading dock, the wheel chocking system comprising:
a guide rail mountable adjacent to a parking surface in front of the loading dock;
a carriage movably mounted to the guide rail and operable to move along a longitudinal axis that extends parallel to the guide rail;
a restraint arm pivotally coupled to the carriage and configured to rotate about a pivot axis between a retracted position and an engaged position, wherein the restraint arm includes a wheel stop configured to extend outwardly from the guide rail and in front of a trailer wheel when the restraint arm is in the engaged position;
a first releasable locking mechanism configured to prevent the restraint arm from rotating away from the trailer wheel about the pivot axis when the restraint arm is in the engaged position; and
a second releasable locking mechanism configured to prevent the restraint arm from moving away from the loading dock along the longitudinal axis when the restraint arm is in the engaged position,
wherein the guide rail includes an upper surface inclined from the horizontal by a first angle, wherein the carriage is movably supported on the inclined upper surface by a system of rollers, and wherein pivot axis is inclined from the vertical by a second angle that is at least approximately equal to the first angle, the inclined pivot axis facilitating rotation of the restraint arm toward the retracted position.

13. A wheel chocking system usable to restrain a trailer at a loading dock, the wheel chocking system comprising:
a guide rail mountable adjacent to a parking surface in front of the loading dock;
a carriage movably mounted to the guide rail and operable to move along a longitudinal axis that extends parallel to the guide rail;
a restraint arm pivotally coupled to the carriage and configured to rotate about a pivot axis between a retracted position and an engaged position, wherein the restraint arm includes a wheel stop configured to extend outwardly from the guide rail and in front of a trailer wheel when the restraint arm is in the engaged position; and
a releasable locking mechanism configured to prevent the restraint arm from rotating away from the trailer wheel about the pivot axis when the restraint arm is in the engaged position;
wherein the guide rail carries a row of teeth, wherein the restraint arm includes a ratchet having a spring-loaded pawl that engages at least one of the teeth when the restraint arm is rotated about the pivot axis toward the engaged position, and wherein engagement of the teeth by the pawl prevents the restraint arm from moving away from the loading dock along the longitudinal axis while permitting the restraint arm to move toward the loading dock along the longitudinal axis.

14. The wheel chocking system of claim 13, further comprising a cam adjustment feature operably coupled between the restraint arm and the carriage, wherein the cam adjustment feature enables the angle of the pivot axis to be changed relative to the carriage.

15. The wheel chocking system of claim 13 wherein the releasable locking mechanism prevents the restraint arm from rotating away from the trailer wheel about the pivot axis unless the releasable locking mechanism is actuated by an operator.

16. A wheel chocking system usable to restrain a trailer at a loading dock, the wheel chocking system comprising:
   a guide rail mountable adjacent to a parking surface in front of the loading dock;
   a carriage movably mounted to the guide rail and operable to move along a longitudinal axis that extends parallel to the guide rail;
   a restraint arm pivotally coupled to the carriage and configured to rotate about a pivot axis between a retracted position and an engaged position, wherein the restraint arm includes a wheel stop configured to extend outwardly from the guide rail and in front of a trailer wheel when the restraint arm is in the engaged position;
   a first releasable locking mechanism configured to prevent the restraint arm from rotating away from the trailer wheel about the pivot axis when the restraint arm is in the engaged position,
   a second releasable locking mechanism configured to prevent the restraint arm from moving away from the loading dock along the longitudinal axis when the restraint arm is in the engaged position; and
   a manual operating handle extending upwardly from the restraint arm, wherein the operating handle enables an operator to rotate the restraint arm about the pivot axis between the retracted position and the engaged position, and wherein the operating handle further enables the operator to move the carriage fore and aft along the longitudinal axis.

17. The wheel chocking system of claim 16 wherein the first releasable locking mechanism prevents the restraint arm from rotating away from the trailer wheel about the pivot axis unless the first releasable locking mechanism is manually actuated by an operator.

18. The wheel chocking system of claim 16, further comprising:
   a signaling system; and
   a sensor operably connected to the signaling system and mounted to at least one of the carriage, the restraint arm, and the guide rail, wherein the sensor is configured to activate the signaling system when the wheel stop is properly positioned in front of the vehicle wheel.

19. The wheel chocking system of claim 16, further comprising a cam adjustment feature operably coupled between the restraint arm and the carriage, wherein the cam adjustment feature enables the angle of the pivot axis to be changed from a first angle to a second angle relative to the carriage.

20. A method of restraining a vehicle during loading or unloading operations at a loading dock, the method comprising:
   providing a wheel chocking system including:
      a guide rail mounted adjacent to a parking surface in front of the loading dock;
      a carriage movably mounted to the guide rail; and
      a restraint arm pivotally coupled to the carriage about a pivot axis inclined at an angle relative to the parking surface, wherein the incline of the pivot axis is configured to facilitate rotation of the restraint arm away from at least one wheel of the vehicle, the restraint arm having a wheel stop extending outwardly therefrom;
   rotating the restraint arm away from the guide rail;
   positioning the at least one wheel of the vehicle in front of the loading dock and adjacent the guide rail;
   moving the carriage along the guide rail to position the carriage adjacent the wheel of the vehicle;
   rotating the restraint arm toward the guide rail to position the wheel stop in front of the vehicle wheel; and
   moving the carriage toward the loading dock on the guide rail until the wheel stop contacts the vehicle wheel.

21. The method of claim 20 wherein the pivot axis extends generally perpendicular to a longitudinal axis of the guide rail.

22. The method of claim 20 wherein rotating the restraint arm toward the guide rail includes releasably locking the restraint arm to the guide rail.

23. The method of claim 20 wherein releasably locking the restraint arm to the rail includes preventing the restraint arm from rotating away from the guide rail.

24. The method of claim 20 wherein releasably locking the restraint arm to the rail includes preventing the restraint arm from moving away from the loading dock on the guide rail.

25. The method of claim 22 wherein the pivot axis extends generally perpendicular to a longitudinal axis of the guide rail.

26. A method of restraining a vehicle during loading or unloading operations at a loading dock, the method comprising:
   providing a wheel chocking system including:
      a guide rail mounted adjacent to a parking surface in front of the loading dock;
      a carriage movably mounted to the guide rail;
      a restraint arm pivotally coupled to the carriage about a pivot axis, the restraint arm having a wheel stop extending outwardly therefrom, wherein the pivot axis is inclined at an angle relative to the parking surface, and wherein the incline of the pivot axis is configured to facilitate manual rotation of the restraint arm away from at least one wheel of the vehicle; and
      a manual operating handle extending upwardly from the restraint arm, wherein the manual operating handle enables an operator to retate the restraint arm about the pivot axis, and wherein the operating handle further enables the operator to move the carriage fore and aft along the guide rail;
   manually rotating the restraint arm away from the guide rail;
   positioning at least one wheel of the vehicle in front of the loading dock and adjacent the guide rail;
   manually moving the carriage along the guide rail to position the carriage adjacent the wheel of the vehicle;
   manually rotating the restraint arm toward the guide rail to position the wheel stop in front of the wheel of the vehicle; and
   manually moving the carriage toward the loading dock on the guide rail until the wheel stop contacts the wheel of the vehicle.

* * * * *